US011740637B2

United States Patent
Abramson et al.

(10) Patent No.: US 11,740,637 B2
(45) Date of Patent: Aug. 29, 2023

(54) ZONE MOBILITY SYSTEM AND METHOD FOR AN AUTONOMOUS DEVICE

(71) Applicant: MTD PRODUCTS INC, Valley City, OH (US)

(72) Inventors: Shai Abramson, Pardesiya (IL); Christopher J. Churavy, Lakewood, OH (US); Ryan Cmich, Sharon Township, OH (US); Adam Ference, Westlake, OH (US); Joseph Edward Saunders, Wadsworth, OH (US)

(73) Assignee: MTD PRODUCTS INC, Valley City, OH (US)

( * ) Notice: Subject to any disclaimer, the term of this patent is extended or adjusted under 35 U.S.C. 154(b) by 42 days.

(21) Appl. No.: 16/556,907

(22) Filed: Aug. 30, 2019

(65) Prior Publication Data

US 2020/0073403 A1 Mar. 5, 2020

Related U.S. Application Data

(60) Provisional application No. 62/725,645, filed on Aug. 31, 2018.

(51) Int. Cl.
*G05D 1/02* (2020.01)
*G05D 1/00* (2006.01)

(52) U.S. Cl.
CPC ......... *G05D 1/0265* (2013.01); *G05D 1/0088* (2013.01); *G05D 2201/0208* (2013.01)

(58) Field of Classification Search
CPC combination set(s) only.
See application file for complete search history.

(56) References Cited

U.S. PATENT DOCUMENTS

| 4,791,570 A | 12/1988 | Sherman et al. |
| 2013/0199144 A1 | 8/2013 | Bernini |

(Continued)

FOREIGN PATENT DOCUMENTS

| DE | 202010008800 U1 | 1/2012 |
| DE | 102014226077 A1 | 6/2016 |

(Continued)

OTHER PUBLICATIONS

Cochrum, An Autonomous Lawnmower 'The ManScaper', 2013, Dept. of Electrical Engineering and Computer Science, University of Central Florida, Orlando, Florida, 32816-2450, pp. 1-8 (Year: 2013).*

(Continued)

*Primary Examiner* — Elaine Gort
*Assistant Examiner* — Anthony M Gartrelle
(74) *Attorney, Agent, or Firm* — Wegman Hessler Valore

(57) ABSTRACT

A zone mobility system and method for an autonomous device includes a work area within which the autonomous device is intended to operate, one or more electrically separated boundary conductors, each boundary conductor surrounding a work zone within the work area, a transmitter base electrically connected to at least one of the boundary conductors, and a removably coupled transmitter configured to transmit a signal for directing movement of the autonomous device on the boundary conductor wire. The transmitted signal can be adjusted to optimize the power consumption of the transmitter, and a work operation can be commenced utilizing a transmitter interface, and/or utilizing an autonomous device user interface.

25 Claims, 13 Drawing Sheets

(56) References Cited

U.S. PATENT DOCUMENTS

| | | | |
|---|---|---|---|
| 2016/0165795 A1* | 6/2016 | Balutis | A01D 34/008 |
| 2017/0322562 A1* | 11/2017 | Churavy | G05D 1/0276 |
| 2018/0129199 A1 | 5/2018 | Gustavsson et al. | |
| 2019/0304211 A1* | 10/2019 | Shimamura | G07C 5/008 |

FOREIGN PATENT DOCUMENTS

| | | | | |
|---|---|---|---|---|
| EP | 2375301 | A2 | 10/2011 | |
| EP | 2667272 | A2 | 11/2013 | |
| EP | 2870852 | A1 | 5/2015 | |
| WO | 2016103066 | A1 | 6/2016 | |
| WO | 2017192981 | A1 | 11/2017 | |
| WO | WO-2019039985 | A1 * | 2/2019 | A01D 34/00 |

OTHER PUBLICATIONS

Search Report dated Oct. 16, 2019, issued in Application No. GB1905319.8, 11 pages.
International Search Report and Written Opinion issued in International Application No. PCT/US2019/049030 dated Apr. 6, 2020; 21 pages.
Search and Examination Report issued in GB Application No. GB1905319.8 dated Oct. 16, 2019; 11 pages.
Examination Report issued in GB Application No. GB1905319.8 dated Feb. 3, 2022; 5 pages.

* cited by examiner

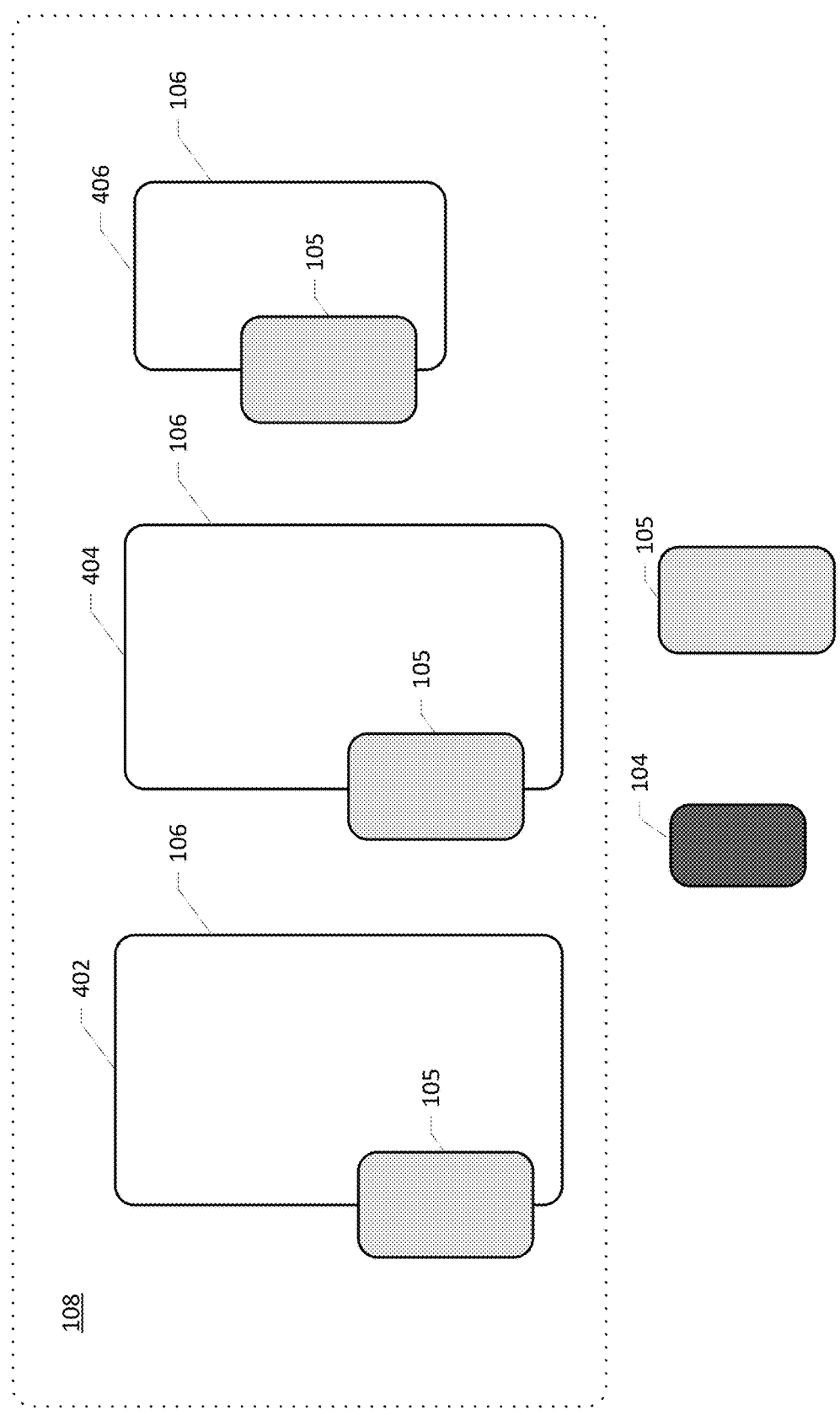

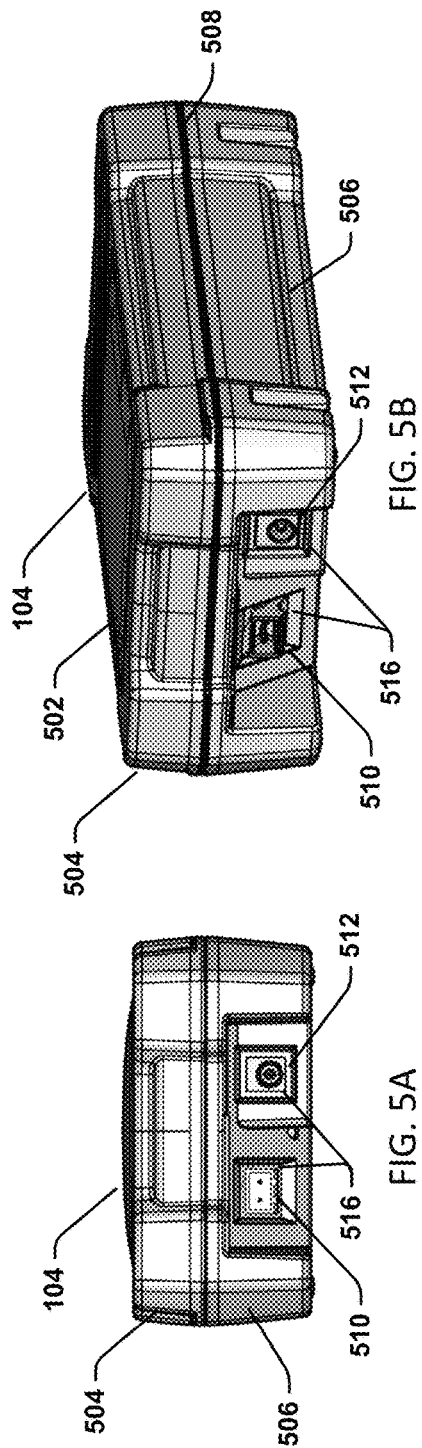
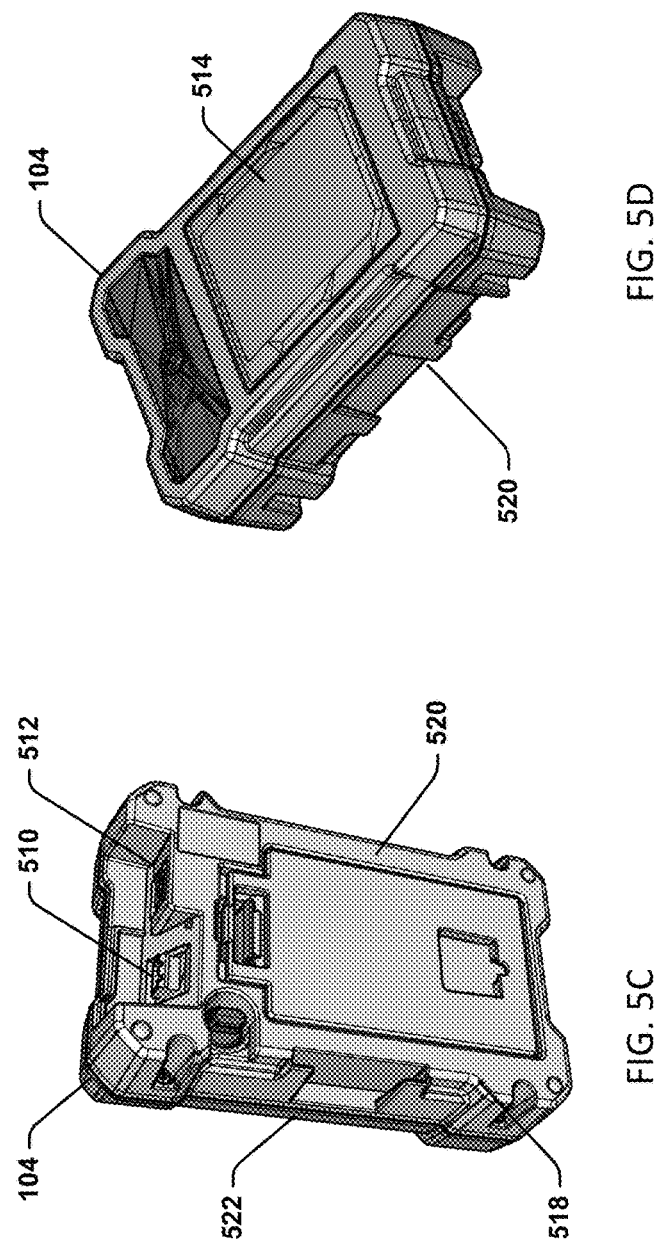
FIG. 5B
FIG. 5D
FIG. 5A
FIG. 5C

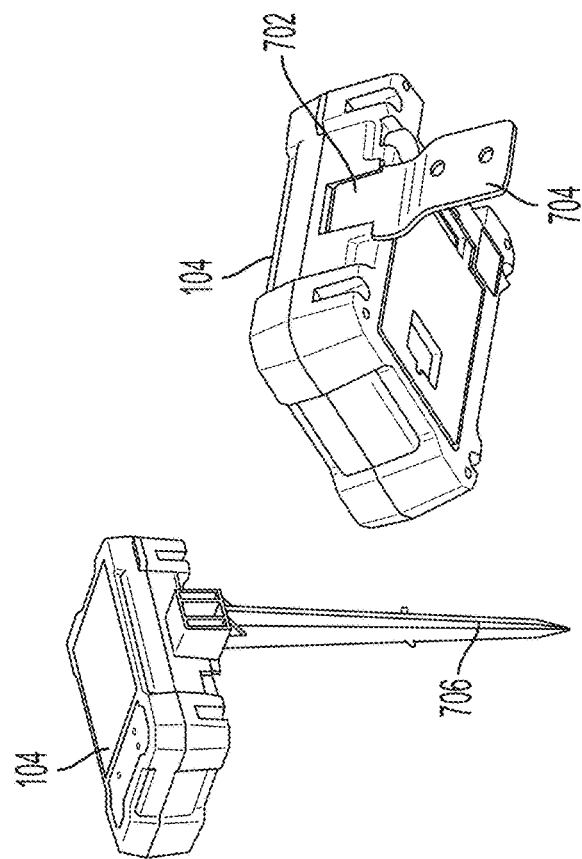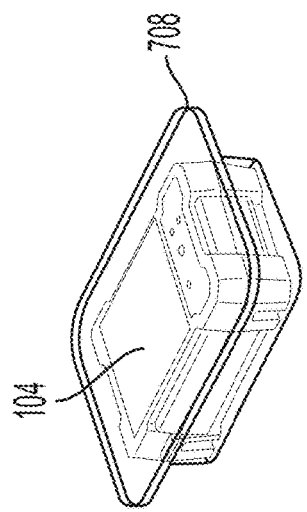
FIG. 7B
FIG. 7D
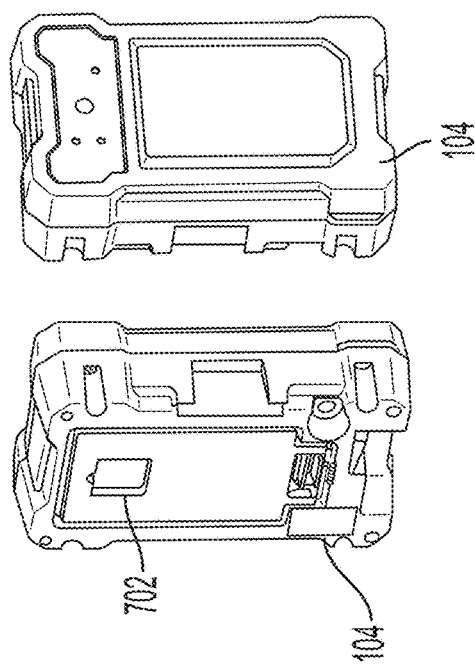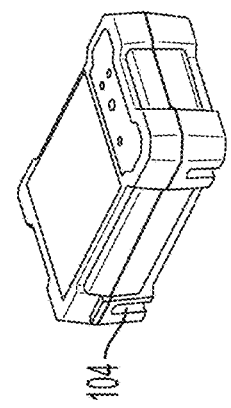
FIG. 7A
FIG. 7C

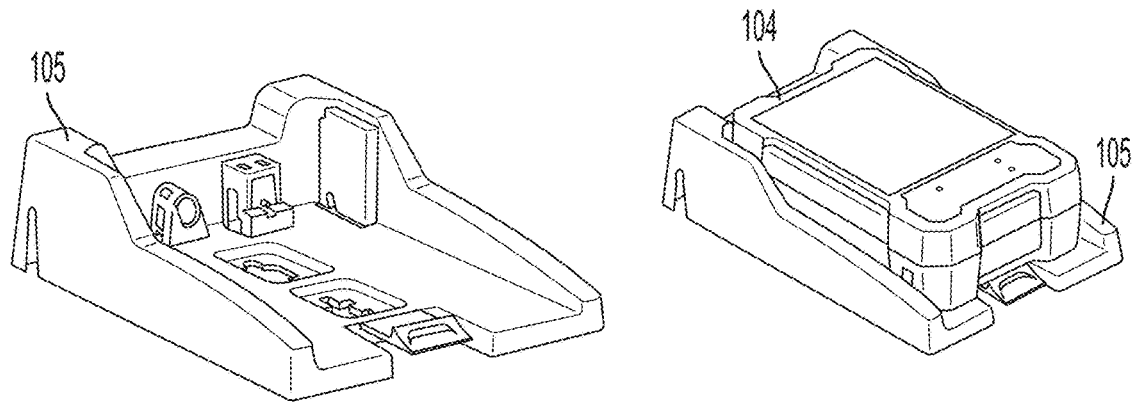
FIG. 9A
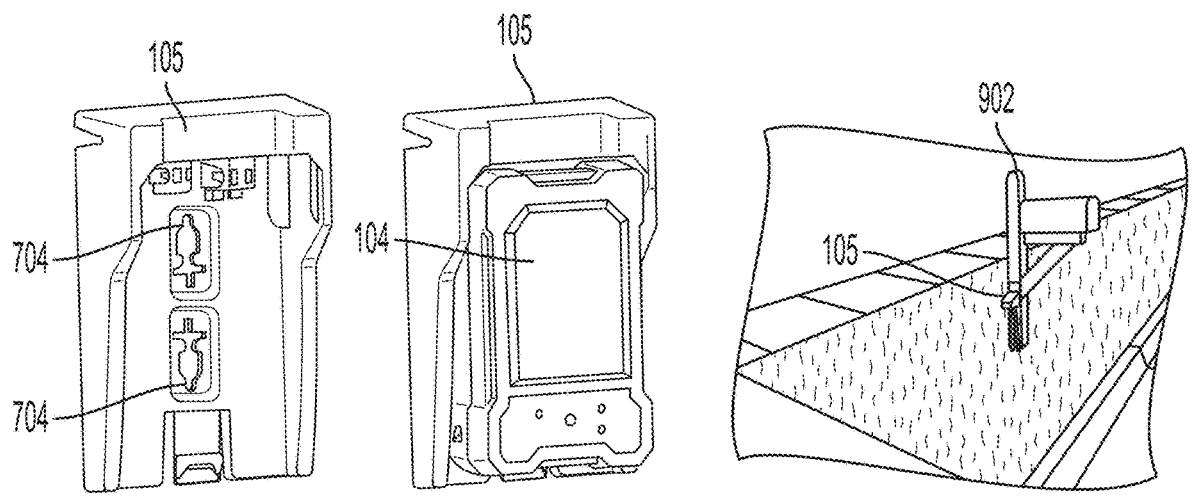
FIG. 9B
FIG. 9C
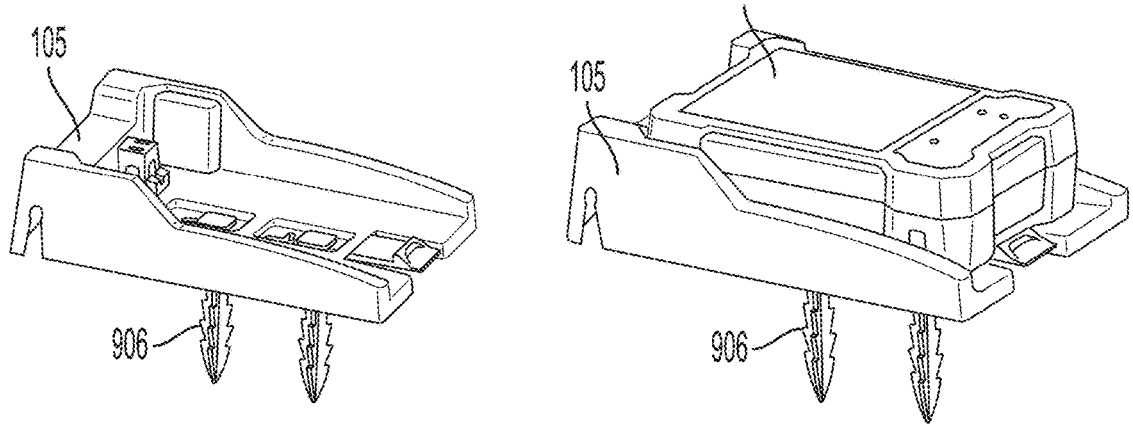
FIG. 9D

ZONE MOBILITY SYSTEM AND METHOD FOR AN AUTONOMOUS DEVICE

CROSS REFERENCE TO RELATED APPLICATIONS

This application claims the benefit of U.S. Provisional Application No. 62/725,645, filed Aug. 31, 2018, the entire disclosure of which is incorporated herein by reference.

FIELD OF THE INVENTION

The disclosed systems and methods are directed to autonomous mower navigation systems and methods, and more particularly, zone mobility systems and methods for confining or localizing an autonomous mower to a number of divided, separated, or unattached work areas, and for directing movement of the autonomous mower.

The disclosed systems and methods can include adaptive power optimization features, for example, the transmitter output power can be automatically adjusted to utilize an optimal power level for transmitting a desired signal on a boundary wire. The disclosed systems and methods can include commencing a work operation utilizing a transmitter interface, and/or commencing a work operation utilizing an autonomous device user interface, and establishing a work operation time period utilizing a switch input.

BACKGROUND OF THE INVENTION

Many conventional autonomous mower navigation systems and methods, or systems and methods for confining a robot to a work area, involve movement and operation of the autonomous mower such as determining a location of the autonomous mower in relation to a single continuous boundary wire. These systems generally require that the autonomous device remain within the work area defined by the boundary wire, for example, a wire arranged around the perimeter of the work area. The work area is the area within which the autonomous mower is intended to operate, for example, a grass covered area of a yard, garden, field or park. Such methods often include a single permanently installed transmitter, for example as a component of a docking station or base station, and generally require, for safety and regulatory compliance reasons, that the autonomous mower not operate outside of a continuously delimited area.

However, many work areas are not easily contained within a single continuous boundary wire, or include areas through which the autonomous mower cannot easily pass. Thus, there remains a need for an efficient and cost-effective solution for autonomous mowing of work areas that include separated or disconnected work areas.

BRIEF SUMMARY OF THE INVENTION

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

In an embodiment, a zone mobility system for an autonomous device, includes a work area within which the autonomous device is intended to operate, one or more electrically separated boundary conductors, each boundary conductor surrounding a work zone within the work area, a transmitter base electrically connected to at least one of the boundary conductors, and a transmitter configured to transmit a signal for directing movement of the autonomous device on the boundary conductor wire, wherein the transmitter is removably coupled to at least one transmitter base In an embodiment, a zone mobility method for an autonomous device, includes providing two or more electrically separated boundary conductors, each boundary conductor surrounding a work zone within a work area within which the autonomous device is intended to operate, electrically connecting a transmitter base to at least one of the boundary conductors, removably coupling a transmitter to the at least one transmitter base, and configuring the transmitter to transmit a signal for directing movement of the autonomous device on the boundary conductor wire.

In an embodiment, an adaptable power optimization system for an autonomous device includes a work area within which the autonomous device is intended to operate, one or more electrically separated boundary conductors, each boundary conductor surrounding a work zone within the work area, and a transmitter configured to transmit a signal for directing movement of the autonomous device on the boundary conductor wire, wherein the transmitter is coupled to at least one boundary conductor, and the transmitted signal is adjusted to optimize the power consumption of the transmitter.

In an embodiment, a system for directing operation of an autonomous device includes a work area within which the autonomous device is intended to operate, one or more electrically separated boundary conductors, each boundary conductor surrounding a work zone within the work area, and a transmitter configured to transmit a signal for directing movement of the autonomous device on the boundary conductor, wherein the transmitter includes a solar component for powering the transmitter and/or for charging a battery of the transmitter

BRIEF DESCRIPTION OF THE DRAWINGS

FIG. 4 is an illustration of an example system for autonomous mower zone mobility in accordance with an aspect of the disclosure.

FIGS. 5A-5D are illustrations of example systems for autonomous mower zone mobility in accordance with an aspect of the disclosure.

FIGS. 7A-7D are illustrations of example systems for autonomous mower zone mobility in accordance with an aspect of the disclosure.

FIGS. 9A-9D are illustrations of example systems for autonomous mower zone mobility in accordance with an aspect of the disclosure.

Figure 1:
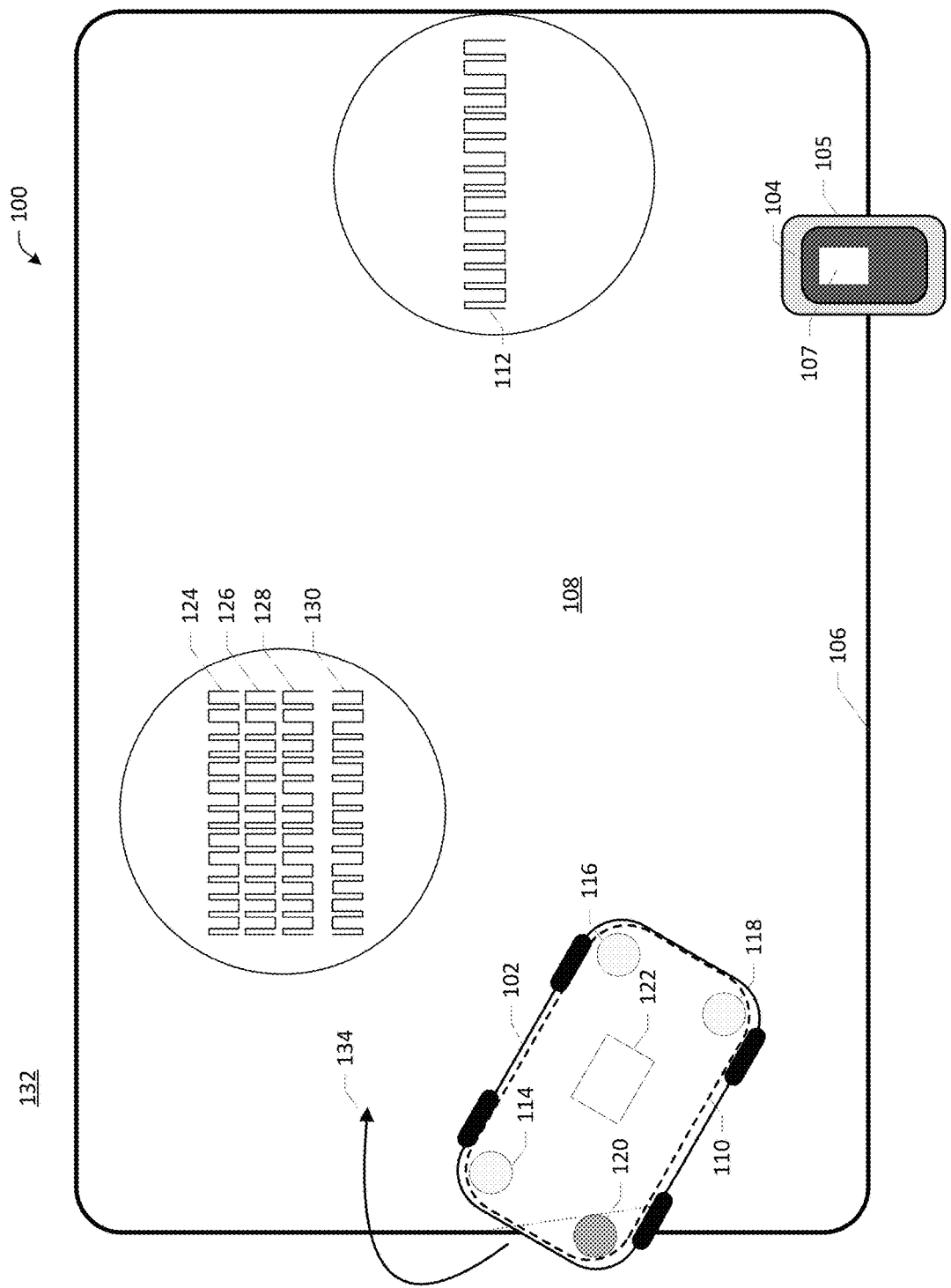
FIG. 1 is an illustration of an example system for autonomous mower zone mobility in accordance with an aspect of the disclosure.

It should be noted that all the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION

The following terms are used throughout the description, the definitions of which are provided herein to assist in understanding various aspects of the subject disclosure.

As used herein, the term "autonomous mower" refers to an autonomous robot, or most any autonomous device or machine that performs various tasks and functions including lawn mowing, lawn maintenance, vacuum cleaning, floor sweeping, and the like.

As used herein, the term "navigation" refers to confinement, or confining an autonomous mower to a work area, determining a location of a robotic mower in relation to a work area, boundary sensing, localization, directing movement of an autonomous mower, ascertaining a position of an autonomous mower, and/or planning and following a route.

As used herein, the term "wire" refers to a wire loop, perimeter wire, perimeter wire loop, conductor, boundary wire, boundary conductor, or other boundary marker for defining a work area. The term "wire" can also refer to multiple wires for defining, for example, multiple work areas, or zones within a work area. The term "wire" can also refer to multiple physically and electrically separate wires for defining, for example, multiple work areas, or zones within a work area.

In the following description, for purposes of explanation, numerous specific details are set forth in order to provide a thorough understanding of the subject disclosure. It may be evident, however, that the disclosure can be practiced without these specific details. In other instances, well-known structures and devices are shown in block diagram form in order to facilitate describing the disclosure.

As illustrated in FIG. 1, a system for autonomous mower navigation 100 includes an autonomous mower 102, a transmitter 104, a wire 106 defining a work area 108 and a receiver 110. The transmitter 104 can be configured to generate and transmit a periodic signal 112 via the wire 106.

The signal 112 is an electromagnetic signal generated by transmitter 104, which travels along the wire 106 inducing a magnetic field that propagates through the air.

In an embodiment, the transmitter 104 is physically attached to, and electrically connected to a transmitter base 105. The transmitter base 105 is in electrical communication with the wire 106. The transmitter 104 includes a processing component 107. The transmitter processor component 107 can be co-located with the transmitter 104. In other embodiments, the transmitter processing component 107 is in operable communication with the transmitter 104, for example connected wirelessly, and is located remotely from the transmitter 104.

In an embodiment, the transmitter processing component 107 includes a microprocessor, controller, memory, current sensing circuitry, signal generator, and other associated hardware, software and algorithms for generating and transmitting a signal 112 over the wire 106. The transmitter processing component 107 can receive input data provided by the current sensing circuitry, and other sensors and inputs.

The transmitter processing component 107 can include analog to digital converters, and signal processing hardware and/or software for generating and transmitting the signal 112. The signal generator is configured to generate different types of electrical waveforms over a range of frequencies that can be transmitted over the wire 106.

The current sensing circuitry can be connected in series with the wire 106, and can include, for example, a resistor of known value which can be used together with a voltage measurement across the resistor in calculating the current through the wire 106. Other suitable methods for calculating current flowing through the wire 106 can be employed by the processing component 107 hardware and/or software as well.

The receiver 110, associated with autonomous mower 102, includes sensors 114, 116, 118, 120, and a processing component 122 for sampling and analyzing the transmitted signal 112. In an embodiment, receiver 110 analyzes signal data useful for directing movement and operation of the autonomous mower, for example, determining a location of the autonomous mower 102 in relation to the wire 106.

The transmitter 104 is operatively coupled to a wire 106 defining a work area 108. The transmitter 104 generates and transmits a signal 112 that travels along the wire 106 inducing magnetic fields. The magnetic fields propagate or otherwise travel wirelessly through the air and are received by the autonomous mower 102. The transmitter 104 produces signals for use by the autonomous mower 102 for multiple functions, in particular, to determine the location of the autonomous mower 102 relative to the work area 108 defined by wire 106, and to direct movement of the autonomous mower 102.

The work area 108 is defined by a boundary, for example, wire 106 arranged around the perimeter of the work area 108. The work area 108 is the area within which the autonomous mower 102 is intended to operate, for example, a grass covered area of a yard, garden, field or park. The wire 106 separates the work area 108, lying within the perimeter defined by the wire 106, from a non-work area 132, which lies outside of the perimeter defined by the wire 106. The autonomous mower 102 is intended to move in relation to the wire 106, and to remain substantially within the work area 108. The autonomous mower 102 can move around the work area 108, for example, in a random pattern or in a predetermined pattern, cutting grass as it goes.

The receiver 110 can include sensors 114, 116, 118, 120 for detecting, receiving and sampling the transmitted signal 112, and processing component 122, discussed in detail below. In an embodiment, receiver 110, and any of sensors 114, 116, 118, 120 and processing component 122, may be integral to or otherwise housed within a body or shell of the autonomous mower 102.

The autonomous mower 102 moves about the work area 108, cutting grass as it goes. In an embodiment, the autonomous mower 102 can operate as a receive-only system that uses the signal transmitted by the transmitter to determine the autonomous mower's 102 location relative to a boundary wire 106. In some embodiments, the autonomous mower 102 can include both receive and transmit capabilities.

Sensors 114, 116, 118, 120 receive the transmitted signal 112 and can be integral to or otherwise housed within the autonomous mower 102, as shown. Sensors 114, 116, 118, 120 can include magnetic sensors, for example, inductive coil sensors, pickup coil sensors and/or search coil sensors for detecting the magnetic field generated by signal 112 transmitted via wire 106.

As shown in FIG. 1, coil sensors 114, 116, 118, 120, for receiving the transmitted signal 112, can be positioned around a periphery of the autonomous mower 102. In other embodiments, sensors 114, 116, 118, 120 can be remote to the autonomous mower 102, for example, located in a work area 108 or outside of a work area 108.

The processing component 122 includes hardware, software, and/or firmware components configured to receive, sample, filter, convert, process and use data, for example, data transmitted by the transmitter 104, and data received by the sensors 114, 116, 118, 120, and other sensors and inputs.

In an embodiment, processing component 122 includes a microprocessor, filtering hardware and software, memory, and other associated hardware, software and algorithms for directing operation of the autonomous mower 102. Processing component 122 can receive input data provided by sensors 114, 116, 118, 120, and other sensors and inputs. Processing component 122 can include analog to digital converters, and digital signal processing hardware and/or software for digitally sampling signal data and for processing the sampled data.

In operation, the autonomous mower moves about the work area 108 as the receiver 110 samples the transmitted signal 112 at intervals. In accordance with the laws of electromagnetism, the magnetic field, e.g. the transmitted signal 112, outside the perimeter defined by the perimeter wire 106 exhibits a 180° phase shift relative to the induced magnetic field inside the perimeter defined by the perimeter wire 106.

As shown in FIG. 1, the reconstructed signal 130, received at sensor 120, is 180 degrees out of phase from the expected sequence and the transmitted signal 112. A signal that is 180 degrees out of phase is an indication that the sensor 120, and thus a portion of autonomous mower 102, is located outside of wire 106, or in a non-work area 132.

In an embodiment, the detection of one or more signals that are 180 degrees out of phase with the transmitted signal 112 cause the autonomous mower 102 to be directed to defined work area 108. The autonomous mower 102 can be directed to move in a direction, and/or at an angle, that will bring it back within the defined work area 108, as indicated by arrow 134.

Therefore, when a portion of the received signals are out of phase, and a portion of the received signals are in phase, with transmitted signal 112, the autonomous mower 102 can be made to move in the direction 134 of the sensors 114, 116, 118 associated with the signals 124, 126, 128 that have been determined by processing component 122 to be in phase with the transmitted signal 112.

When the autonomous mower 102 is determined to be outside the work area 108, and has not been brought back within the defined work area 108, or if the transmitted signal 112 is not detected, the autonomous mower 102 can remain stationary in a standby state, ceasing any moving and/or mowing operations.

Figure 2:
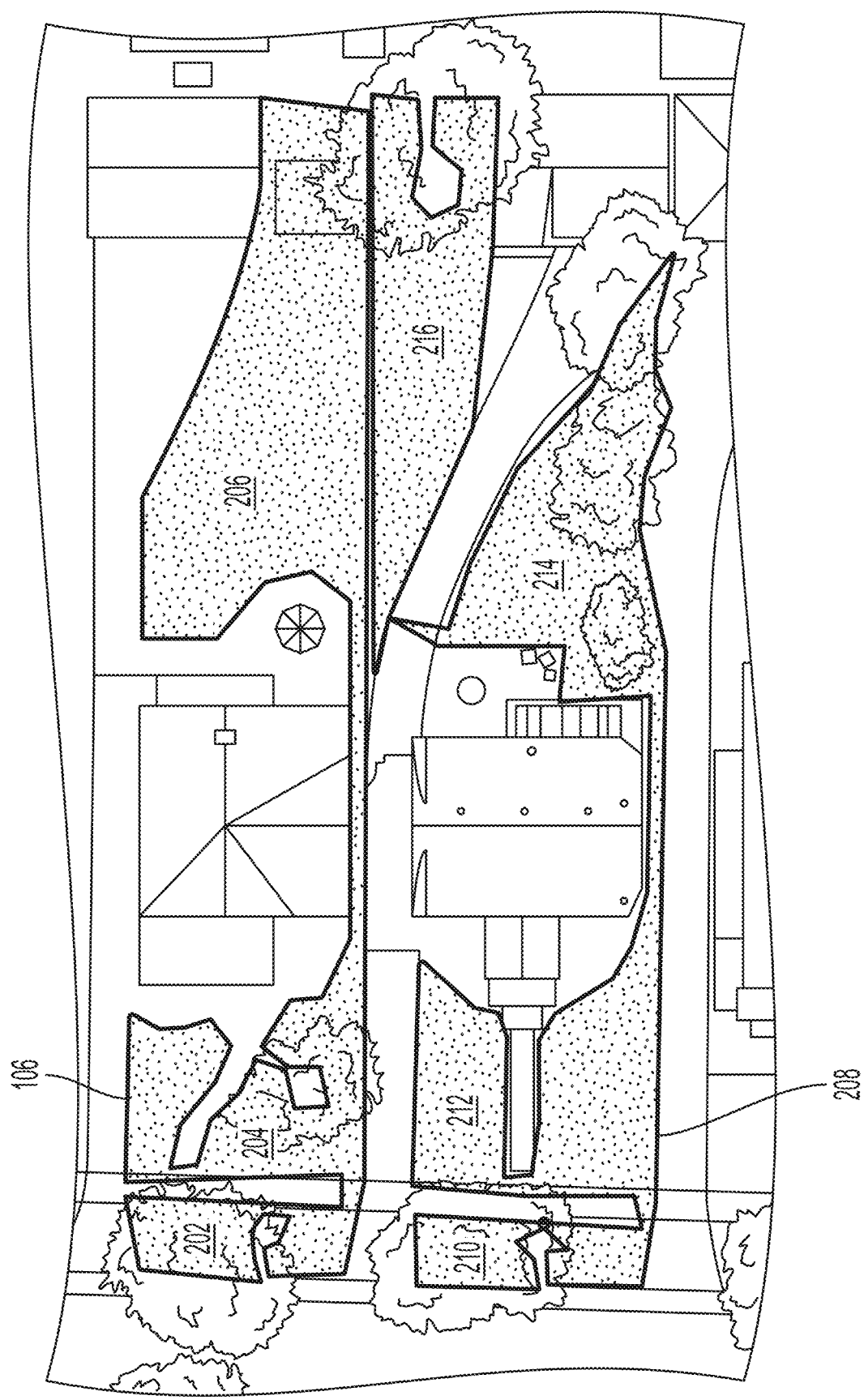
FIG. 2 is an illustration of an example system for autonomous mower zone mobility in accordance with an aspect of the disclosure.
Figure 3:
FIG. 3 is an illustration of an example system for autonomous mower zone mobility in accordance with an aspect of the disclosure.

Referring to FIG. 2 and FIG. 3, in an embodiment, the perimeter wire 106 can include a continuous wire 106 for defining multiple work zones 202, 204, 206 or work areas within a larger overall work area 108. In aspects, a second nearby but independent system for autonomous mower navigation 200, includes a continuous wire 208 for defining multiple work zones or areas 210, 212, 214, and 216. The wires 106, 208 can be driven with signals that are chosen so as not to interfere with each other, thereby enabling the system 100 to distinguish a particular signal 112 transmitted via the perimeter wire 106 from signals transmitted via the perimeter wire 208, and other nearby signals. Thus, the system 100 can distinguish the perimeter wire signal 112 from other signals.

The perimeter wire 106 can be electrically connected directly to the transmitter 104, or to the transmitter 104 by way of the transmitter base 105. In an embodiment, the wire 106 defining the work area 108, and multiple work areas 202, 204, 206 is electrically connected to a single transmitter 104.

In an embodiment, multiple work zones 202, 204, 206 in a work area 108 are connected by a continuous perimeter wire 106. Each zone is electrically connected to the other zones and a single transmitter 104 is used to drive the signal 112 across multiple work zones 202, 204, 206. In general, the multiple work zones 202, 204, 206 are connected by narrow or restricted areas 220, 222 that do not allow the autonomous mower 102 to move freely from one work zone to another.

In operation, the autonomous mower 102 can be manually moved from one work zone to the next to complete the mowing operation in the respective zones. The autonomous mower 102 is manually moved, i.e., the user transports the autonomous mower 102, to and from each zone 202, 204, 206 to be serviced. For example, when the passageways between zones 202, 204, 206 are too narrow for the autonomous mower 102 to travel independently, or are otherwise impassable by the autonomous mower 102. The autonomous mower 102 is placed in work zone 204, and a mowing operation is commenced. When the mowing operation has completed, the autonomous mower 102 is placed in a different work zone, e.g., 202 or 206, and a mowing operation is commenced for that zone, and so on until mowing operations have been completed in some or all of the work zones 202, 204, 206.

In an embodiment, the transmitter base 105 is electrically connected to external power, and to the perimeter wire 106. In other embodiments, the transmitter base 105 is electrically connected to the perimeter wire 106 only. When the transmitter 104 is installed in a transmitter base 105 that is electrically connected to the perimeter wire 106 only, and not to an external power source, the transmitter 104 utilizes battery and/or solar power. In further embodiments, the transmitter base 105 is electrically connected to external power only, and serves a recharge station for the perimeter wire transmitter 104.

In some installations, the perimeter wire 106 is run from work zone to work zone through narrow areas as parallel wires, across sidewalks and driveways, for example, in existing expansion joint, or a newly cut slot. A continuous perimeter wire 106 can also be installed beneath concrete areas such as driveways, walkways, and/or sidewalks. The perimeter wire 106 can be run through a garden, and through other non-grass portions of a property.

In an embodiment including a work area 108 including multiple work zones 202, 204, 206 connected by a continuous perimeter wire 106, the work area can be about ≤400 square meters in total area, and each zone can be approximately ≤200 square meters in area. In an embodiment, the perimeter wire 106 can be about ≤400 meters in total length. In other embodiments, the installed wire can be about ≤250 meters in total length.

A single transmitter 104 for multiple work zones can be installed more cost effectively and efficiently when compared to the use of multiple electrically separate perimeter wires 106, and transmitters 104. In an embodiment, the transmitter 104 can be installed in a protected location outside of the mowing area, where it is sheltered from the elements, and will not be damaged during mowing, and is less likely to be subject to vandalism or theft. The use of a single transmitter 104 also provides convenience as the user is not required to transfer the transmitter 104 to multiple electrically separated work zones for the work zones to be serviced.

Referring to FIG. 4, in an embodiment, the wire 106 can include a plurality of electrically separate wires 106 for defining multiple work zones 402, 404, 406 within a work area 108. Thus, each work zone 402, 404, 406 is defined by an electrically and physically separate wire 106. Each work area 108 or work zone can include a transmitter 104 and/or transmitter base 105. The transmitter 104 can provide a perimeter signal 112 in separate areas where a docking station has not been installed, or where it is impractical or inconvenient to install a traditional docking station or base station.

The use of multiple shorter wire runs can be maintained more easily, and locating breaks or damage to a shorter wire can be done more quickly. Shorter wire runs can also eliminate the need for long lengths of perimeter wire run between zones which may be difficult to access, and/or that pass through surfaces that would require cutting, for example, across a driveway or walkway.

In an embodiment, the work zones 402, 404, 406 are each about ≤200 square meters in area. In aspects, each work zone 402, 404, 406 can include a perimeter wire that is less than about 400 meters in total length.

In a further embodiment, a work area 108 includes a single perimeter wire transmitter 104, and multiple transmitter bases 105. A transmitter base 105 can be installed at each work zone 402, 404, 406 defined by a separate perimeter wire 106. During operation, the user places the perimeter wire transmitter 104 and the autonomous mower 102 in the proper location of the zone to be serviced. For example, to service work zone 402, the user installs the transmitter 104 into the work zone 402 transmitter base 105, and places the autonomous mower 102 within the boundary of the work zone 402 perimeter wire 106. The transmitter 104 can be moved to other transmitter bases 105 in the work zones to be serviced. The autonomous mower 102 is placed within the boundary of the perimeter wire 106 of the work zone 404, 406 to be serviced.

In an example installation having multiple work zones 402, 404, 406, each work zone defined by a perimeter wire 106, each zone can be approximately ≤200 square meters in area. In an embodiment, the installed wire can be about ≤150 square meters.

In other embodiments, multiple dedicated, or exclusively allocated, perimeter wire transmitters 104 are electrically connected and permanently installed at the respective work zones 402, 404, 406. For example, a dedicated perimeter wire transmitter 104 is installed at a work zone 402, and is configured to remain in place for transmitting the perimeter wire signal 112 for that zone 402.

The dedicated transmitters 104 can be electrically connected to external power and the perimeter wire 106 for that zone, or to the perimeter wire 106 only, in which case the transmitter 104 is configured to utilize battery and/or solar power. The dedicated transmitter 104 can be wired directly to the perimeter wire or can utilize a transmitter base 105 to connect to the wire and or external power.

During operation, the appropriate dedicated perimeter wire transmitter 104 is powered on and begins to transmit in the zone to be serviced, and the autonomous mower 102 is manually placed in the proper location of the zone to be serviced. For example, to service work zone 402, the transmitter 104 in work zone 402 is powered on and begins transmitting a signal 112. The autonomous mower 102 is placed within the boundary of the work zone 402 perimeter wire 106.

In further embodiments, a work area 108 can include a combination of work zones utilizing a single perimeter wire transmitter 104 with multiple transmitter bases 105, and one or more work zones utilizing dedicated transmitters 104.

For example, a work area 108 can include a combination of one or more permanently installed transmitters 104 at each of a number of respective zones, and one or more transmitter bases 105 installed at additional zones. A single transmitter 104 can be moved from transmitter base 105 to transmitter base 105 as needed.

A combination of permanently installed transmitters 104, and moveable transmitters 104 used with transmitter bases 105, provides flexible installation options for tailoring to the unique characteristics of a particular work area 108, and/or the user's preferences.

In an example, a permanently installed transmitter 104 can be utilized in backyard zones which may be more protected from the elements, traffic, and theft. While other zones 402, 404, 406 where the transmitter 104 may be more susceptible to damage or theft, e.g., tree lawn and front yard, are configured with a transmitter base 105 and a moveable, removable transmitter is installed during use, and moved from zone to zone 402, 404, 406 to service each zone 402, 404, 406 as desired. When the service, or mowing operation has been completed, the moveable, removable transmitter 104 can be connected to external power in a protected area for charging storage.

During operation, an autonomous mower 102 is placed within the boundary 106 of the work zone 402, 404, 406 to be serviced. Either the appropriate permanently installed perimeter wire transmitter 104 in the zone to be serviced is powered on and transmits a signal 112, or the transmitter 104 is connected to the transmitter base 105 installed in the work zone.

In an embodiment, solar power can be used to power the transmitter 104, and/or for battery charging. The transmitter 104 utilizing solar power can be temporarily or permanently installed in areas that receive at least a minimum acceptable amount of sun irradiance. The transmitter 104 can be electrically connected to external power and to the perimeter wire 106, or to the perimeter wire 106 only, in which case the transmitter 104 can be configured to utilize battery and/or solar power.

In other embodiments, the transmitter 104 is utilized for portions of an otherwise fully autonomous installation. For example, an autonomous mower charging or docking station includes a transmitter 104. The autonomous mower 102 can service a first work area connected to the docking station without user intervention. In addition to the first work area that is serviced in a fully autonomous manner, a user can service one or more separate work zones. The separated work zones can include the appropriate perimeter wires 106, and most any combination of permanently installed transmitters 104, and/or transmitter bases 105 installed at the additional zones. Multiple additional zones can be connected by a continuous perimeter wire 106, wherein each zone is electrically connected to the other zones, and a single transmitter 104 used to drive the signal 112 for the multiple zones.

A combination of permanently installed transmitters 104 can be used, for example, one or more perimeter wire transmitter 104 at each of a number of respective work zones, and one or more transmitter bases 105 installed at additional zones, and/or directly accessible perimeter wire terminations. A single transmitter 104 is moved from transmitter base 105 to transmitter base as needed, and operated as described in detail above.

In other embodiments, a traditional fully autonomous installation in one work zone is complemented with one or more perimeter wire transmitters 104 at each of a number of respective work zones 402, 404, 406, and one or more transmitter bases 105 installed at additional zones. A single transmitter 104 is moved from transmitter base 105 to transmitter base 105 as needed. The user manually places the autonomous mower 102 within the work zone or work zones to be serviced.

Turning to FIGS. 5A-5D, an example transmitter 104 includes a weatherproof or waterproof enclosure 502, including an enclosure top portion 504 and an enclosure bottom portion 506. The transmitter enclosure 502 houses a printed circuit board assembly including microcontroller and associated electronics for generating the perimeter wire signal 112, and for adapting the signal 112 for a range of perimeter wire 106 lengths and configurations. The transmitter enclosure 502 can also house a transmitter power supply in the form of a rechargeable battery, or battery pack, and associated battery charging circuitry.

The enclosure 502 further comprises a sealing member 508, positioned between the enclosure top portion 504 and the enclosure bottom portion 506, which seals the interior of the enclosure 502. The sealing member 508 operates in a radial manner so as to seal along the perimeter of the enclosure 502. The sealing member 508 can be formed of a unitary sealing member encompassing the perimeter of the enclosure 502, or can be comprised of a plurality of seals that are placed about the perimeter of the enclosure 502. In some embodiments, the sealing member is a multi-lip radial seal. In other embodiments, the sealing member 18 can be an O-ring, quad-ring or similar elastomeric form.

An example transmitter enclosure 502 includes at least one perimeter wire connector 510 and an external power connector 512. For installations that include the use of the transmitter base 105, the transmitter base perimeter wire connector 604 and the transmitter base external power connector 606 correspond with the transmitter perimeter wire connector 510 and the transmitter external power connector 512, respectively. In an embodiment, the transmitter perimeter wire connector 510 and the transmitter base perimeter wire connector 604 comprise a mating pair, for example, a plug and receptacle each with electrically conductive male (pins) or female (sockets) contacts. Similarly, the transmitter external power connector 512 and the transmitter base external power connector 606 comprise a mating pair.

The perimeter wire 106 terminates in connectors for connection to the transmitter perimeter wire connector 510 and/or the transmitter base perimeter wire connector 604. Thus, the electrical connection from the transmitter 104 to the perimeter wire 106 can be made directly, or via the transmitter base 105. Similarly, the electrical connection from the transmitter 104 to an external power source can be made directly from the transmitter 104 to the external power source, or via the transmitter base 105.

The transmitter 104 can be powered by an external power source, and/or by a rechargeable battery. The battery can be charged utilizing an external power source. In an embodiment the transmitter battery is charged while the transmitter 104 is installed in a transmitter base 105 which has an electrical connection to an external power source. In other embodiments, the transmitter base 105 is not connected to an external power supply, and the transmitter battery is charged before being installed in the transmitter base 105 to drive the signal 112 on the perimeter wire 106.

In some embodiments, the transmitter 104 can include a solar component, for example, a collection of photovoltaic cells or modules, e.g., a solar panel 514 installed on the enclosure top portion 504, and associated circuitry for charging the transmitter 104 battery.

In an embodiment, the transmitter perimeter wire connector 510 and the external power connector 512 are weatherproof and/or waterproof. In an example assembly method, the transmitter enclosure openings 516 are bordered with a thin wall of plastic (not shown) sized for an interference fit with the connectors 510, 512. As the perimeter wire connector 510 and the external power connector 512 are pushed through the openings 516, the thin walls deform slightly and form a temporary seal with the outer portion of the connectors 510, 512.

The resulting cavity in the enclosure 502, including the portions of the connectors 510, 512 that are within the enclosure 502, can be filled with a structural adhesive, for example, an epoxy potting compound, thereby robustly and permanently sealing the connectors 510, 512. This method allows the use of standard connectors and eliminates the requirement for more costly off the shelf sealed connectors.

The transmitter enclosure 502 is sized and shaped to be easily and conveniently transported to and installed into the transmitter base 105, or multiple transmitter bases to accomplish a work task, for example for mowing multiple work zones as detailed above.

Figure 8A:
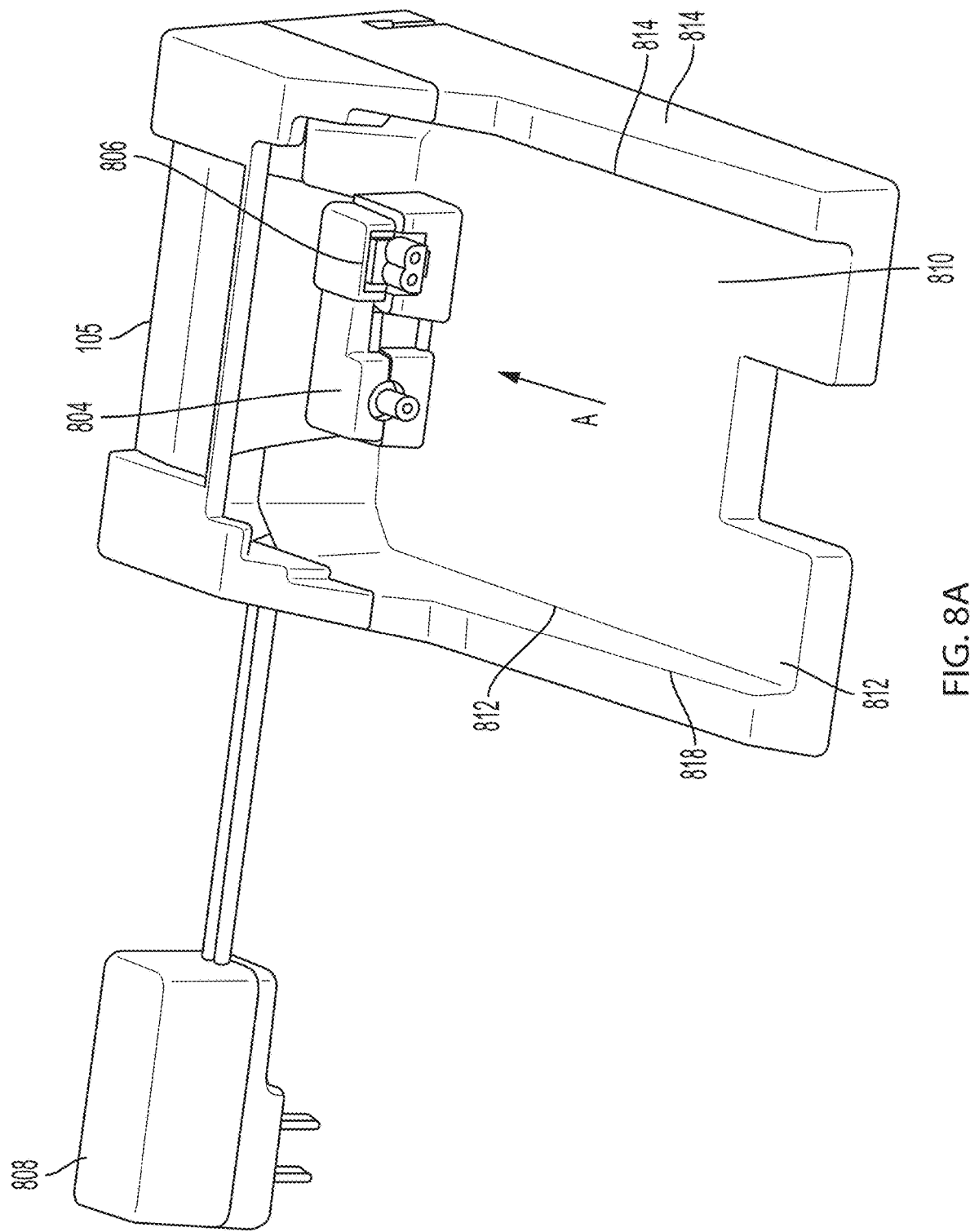
FIGS. 8A-8C are illustrations of example systems for autonomous mower zone mobility in accordance with an aspect of the disclosure.

The transmitter enclosure 502 can include retaining structures, e.g., grooves and/or protrusions 518, 520, 522 arranged along the enclosure top portion 504 and/or the enclosure bottom portion 506. The retaining grooves, channels, and/or protrusions 518, 520, 522 are configured to work together with the retaining grooves and/or protrusions of the transmitter base 818, 820, 822 (as shown in FIG. 8A).

The retaining grooves, channels, and protrusions 518, 520, 522 on the exterior of the transmitter enclosure 502 work in concert with the retaining grooves 818, 820, 822 of the transmitter base to guide the insertion of the transmitter 104 into the transmitter base 105, and to align the base connectors 604, 606 for proper engagement with the corresponding transmitter connectors 510, 512. When the transmitter 104 is installed in the transmitter base 105, the transmitter base bottom portion 610, sidewalls 612, 614 and/or back wall 616 engage and abut the corresponding features of the transmitter 104, capturing the transmitter 106 in place, and providing a secure electrical connection from the transmitter 104 to the perimeter wire 106 and/or an external power source via the transmitter base 105.

Figure 6A:
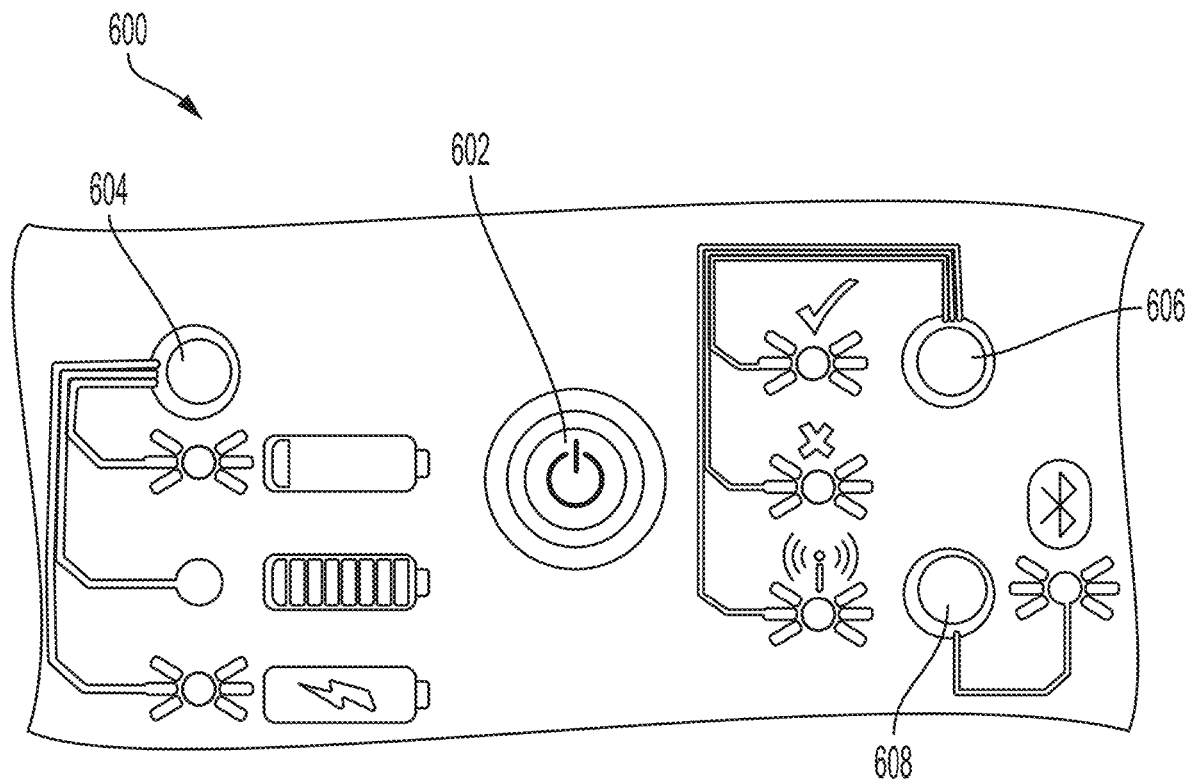
FIGS. 6A-6B are illustrations of example systems for autonomous mower zone mobility in accordance with an aspect of the disclosure.
Figure 6B:
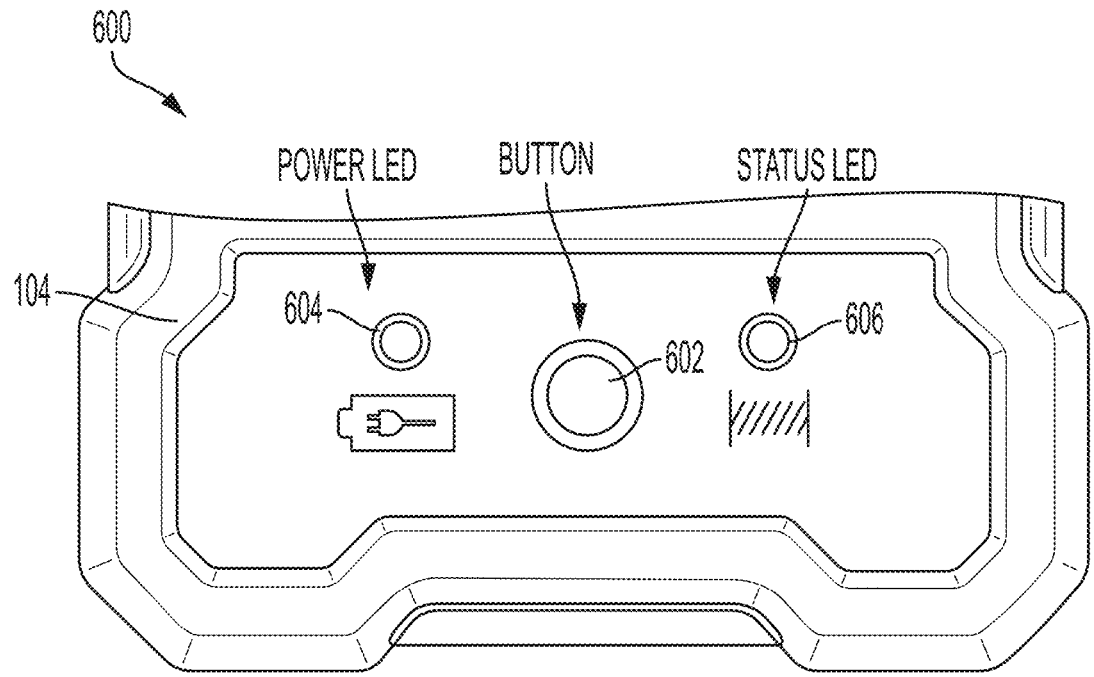

Referring now to FIGS. 6A and 6B, an example user interface 600 for a transmitter 104 includes a switch 602, and one or more indicators 604, 606, 608 for communicating a state or status of the transmitter 104, and/or the confinement system 100, to the user.

The switch 602 can be a momentary pushbutton switch which is pressed and released to power the transmitter 104 to an "ON" state. Once in the "ON" state, the transmitter 104 initializes, and is ready to transmit a signal 112 via the wire 106. When the transmitter 104 is in the "ON" state, the switch 602 can be pressed and released to return the transmitter 104 to the "OFF" state.

Once powered on, the transmitter 104 can begin transmitting and remain in the "ON" state for a pre-defined period of time. The transmitter 104 can be automatically powered "OFF" at the expiration of the pre-defined time period. The pre-defined period of time can be determined as a calculated work time based on the expected battery life of the transmitter 104, the expected battery life an associated autonomous device 102, and/or taking into account the area of one or more work zones 202, 204, 206. The pre-defined time period can be useful for conserving energy, and preserving the battery life of the transmitter 104. The pre-defined time period, and automatic shut-off features are convenient for the user, since there is no need to manually power off the transmitter 104 when a mowing or other work operation has been completed.

In other embodiments, the user can select a length of time for the mowing operation utilizing an autonomous mower 102 interface. For example, the autonomous mower user interface can include a switch or start button (not shown) that is activated to begin a mowing operation, and to choose a length of time for the mowing operation. In an example embodiment, one button press causes the autonomous mower 102 to operate for thirty minutes, after which time the autonomous mower 102 will stop. To service a larger area such as a back yard, the start button can be pressed 3 times, and the autonomous mower 102 will operate for three increments of time, or three times thirty minutes, for a total of ninety minutes.

The start button can be activated multiple times, for example, depending on the size of the area to be mowed. In further embodiments, the length of operation time associated with each button activation, and a minimum and maximum number of button activations, can be customized based on, for example, the capabilities or specifications of the autonomous mower 102, and the transmitter 104, the user's preferences, and/or the area to be serviced.

In other embodiments, for example, when the area to be serviced is a smaller area, such as a tree lawn, the start button is pressed once resulting in a thirty-minute run. The autonomous mower user interface can include indicators (not shown) associated with the start button, or switch. The indicators can communicate how many times the start button has been pressed, and thus the set mowing time. For example, the user presses the start button twice, the autonomous mower user interface indicators are activated indicating a mow time of one hour.

In further embodiments, the autonomous mower 102 includes a wireless module including a wireless transceiver, for example, Wi-Fi, Bluetooth®, and/or Bluetooth Low Energy Technology (BLE), which provides wireless access to autonomous mower 102 functionality. The autonomous mower wireless module can also enable communication between the autonomous mower 102 and the transmitter 104 which can include a compatible wireless module having a wireless transceiver. The autonomous mower 102 can communicate with a transmitter 104 that is within range of the respective wireless modules. In an embodiment, the autonomous mower 102 sends a message to a transmitter 104 connected to a work zone 402, 404, 406 within which the autonomous mower 102 is located.

In aspects, the autonomous mower 102 communicates with the transmitter 104, and causes the transmitter to begin transmitting a signal 112 that travels along the wire 106 surrounding the work zone. Once the transmitter has begun to transmit the signal 112, the autonomous mower performs a work operation with the work zone.

When the autonomous mower 102 has completed the work operation, the autonomous mower can communicate with the transmitter 104, providing instructions that cause the transmitter 104 to stop transmitting the signal 112, and to power down. The autonomous mower 102 can also power itself down once the instructions have been provided to the transmitter 104. The ability of the autonomous mower 102 to control the operating time of the transmitter 104 is useful for conserving energy, and preserving the battery life of the autonomous mower 102 and the transmitter 104.

In still further embodiments, the autonomous mower 102 communicates with the transmitter 104 connected to a work zone 402, 404, 406 within which the autonomous mower 102 is located, and causes the transmitter to begin transmitting a signal 112. The autonomous mower 102 provides instructions that cause the transmitter 104 to stop transmitting the signal 112, and to power down, after a pre-determined time period has elapsed. The pre-defined time period can be useful for conserving energy, and preserving the battery life of the autonomous mower 102 and the transmitter 104.

Referring again to FIGS. 6A and 6B, an example user interface 600 for a transmitter 104 includes indicators 604, 606, 608, for example, light emitting diode (LED) indicators that are configured to communicate a state or status of the transmitter 104, and/or the confinement system 100 to the user. The indicators 604, 606, 608 can remain on in a steady state for a period of time, and then blink slowly to preserve battery power.

The power indicator 604 is used to communicate various transmitter 104 power related conditions. For example, the battery status 604 indicator can indicate battery charging, battery charging complete, low battery, critical low battery, transmitter 104 connected to external power, external power out of range, battery not chargeable, and/or other power related conditions. In an embodiment, the power indicator 604 blinks red with a period of 2000 ms and a duration of 100 ms when the transmitter 104 battery voltage falls below a low battery threshold level. In the event the transmitter 104 battery voltage falls below a critical low battery threshold level, the power indicator 604 can blink red with a period of 500 ms, and a duration of 100 ms.

In an embodiment, the power indicator 604 appears green when the transmitter 104 battery charging is complete, or when the transmitter 104 is connected to external power. The power indicator 604 can appear amber when the transmitter 104 battery is charging.

In the event the transmitter 104 is connected to external power, and the transmitter 104 has determined that the battery is not capable of being charged, the power indicator 604 appears red. When the transmitter 104 is connected to external power, and the external voltage is out of range, the power indicator 604 blinks red with a period of 500 ms, and a duration of 100 ms. In an embodiment, an out of range condition is indicated when the external voltage, supplied by the external power supply, is not within the required operating limits of the transmitter 104. For example, the transmitter 104 has been connected to an incompatible external power supply.

The status indicator 606 is configured to communicate a status condition to the user, for example, a status of the transmitter 104, or the perimeter wire 106. When the transmitter 104 is in the "ON" state, and the wire 106 has been detected as being good, the status indicator 606 blinks green with a period of 2000 ms, for a duration of 100 ms.

When the transmitter is in the "ON" state, and it has detected that the wire 106 is broken, the status indicator 606 blinks red with a period of 500 ms, for a duration of 100 ms. When the transmitter is in the "ON" state, and the wire 106 has been as having a length greater than a maximum length, i.e. the wire 106 is too long, the status indicator 606 blinks red with a period of 2000 ms, for a duration of 500 ms.

The transmitter 104 can drive a signal 112 onto a perimeter delimiting wire 106 for a separated zone inducing a characteristic magnetic field compliant to various regulatory requirements, for example, the Radio Equipment Directive (RED) 2014/53/EU requirement in Europe for wireless transmitters. In an embodiment, the perimeter wire transmitter 104 is configured to transmit utilizing one of five RED channels. The signal 112 can be compliant with other regulatory requirements directed to signals 112 used for confining an autonomous device 102 within a work area 108.

In an embodiment, the transmitter 104 can transmit on one of a number of predetermined channels. The user can select the transmit channel based on the requirements of the autonomous device 102, and/or to avoid or reduce interference with other nearby transmitters or autonomous systems.

The switch 602 can be used to change or select the transmitter 104 transmit channel. The switch 602 is pressed and released to power the transmitter 104, to an "ON" state. Once in the "ON" state, the switch 602 is pressed and held for a period of time to enter a transmit channel change mode. For example, the switch 602 is depressed and held for approximately 10 seconds or greater, the status indicator 606 blinks amber.

In channel change mode, the status indicator 606 will blink period of 500 ms, a duration of 100 ms, and an off time of 5 seconds. For example, when the transmitter 104 is transmitting on channel 3, the status indicator 606 appears amber in color, and blinks three times at a period of 500 ms, and a duration of 100 ms, and then turn off for five seconds, before repeating the sequence. For example, a number of blinks are followed by a pause, and the consecutive number of blinks between the pauses can correspond to a channel setting. In an embodiment, a single blink indicates channel 1, two consecutive blinks followed by a pause, indicates channel 2, and so on.

The transmitter 104 transmit channel, can be selected while the transmitter 104 is in the "ON" state by entering the Channel Change Mode as detailed above, and then momentarily pressing the switch 602. The transmit channel will move to the next channel each time the switch 602 is pressed.

To exit Channel Change Mode, the switch 602 is depressed and held for approximately 20 seconds or greater, the status indicator 606 blinks amber. When exiting channel change mode, the status indicator 606 will blink period of 500 ms, a duration of 100 ms, and an off time of 5 seconds.

In an embodiment, the transmitter 104 includes a wireless module including a wireless transceiver, for example, Wi-Fi, Bluetooth®, and/or Bluetooth Low Energy Technology (BLE), which provides wireless access to transmitter 104 functionality. The wireless transceiver can also utilize 3G, 4G, 4G LTE, WiMAX, or UWB signals, or most any other wireless signals or technology. An optional wireless connection indicator 608 can include, for example, a blue LED. The wireless connection indicator 608 is active to indicate that the wireless transceiver module is operational.

The wireless transceiver module provides a wireless connection between the transmitter 104 and a user device, and can provide access to functionality including for example, transmitter 104 system diagnostics, firmware update, and/or to select a signal 112 transmit channel. The wireless module can facilitate communication between the transmitter 104 and an autonomous device 102.

Referring to FIGS. 7A-7D, the transmitter 104 can be installed, secured, and/or mounted utilizing several methods. In embodiments, the transmitter 104 is installed outdoors and can be hung or otherwise attached, and mounted in a horizontal or vertical orientation to a portion of the exterior of a building, a post, tree, or other suitable surface. The transmitter 104 can include features, for example, detents 702, brackets 704, mounting holes and the like, that facilitate hanging or mounting to vertical and horizontal surfaces.

Referring to FIG. 7B, the transmitter 104 can be mounted utilizing a stake or stakes 706 which secure the transmitter 104, to the ground in a horizontal position, i.e. parallel to the ground. In an embodiment, the stakes 706 can the same as or similar to perimeter wire stakes utilized to secure the perimeter wire 106 to the ground. In further embodiments, when the transmitter 104 includes a solar panel 514 for battery charging, the transmitter base 105 can be installed outdoors in a position and location selected for optimized exposure to solar irradiance.

As shown is FIGS. 7C and 7D, the transmitter 104 can be installed on the ground surface, or recessed into the ground such that the top portion 504 of the transmitter enclosure 502 is substantially even with the ground. In an embodiment, the transmitter 104 is recessed into the ground utilizing an in-ground socket 708.

Figure 8B:
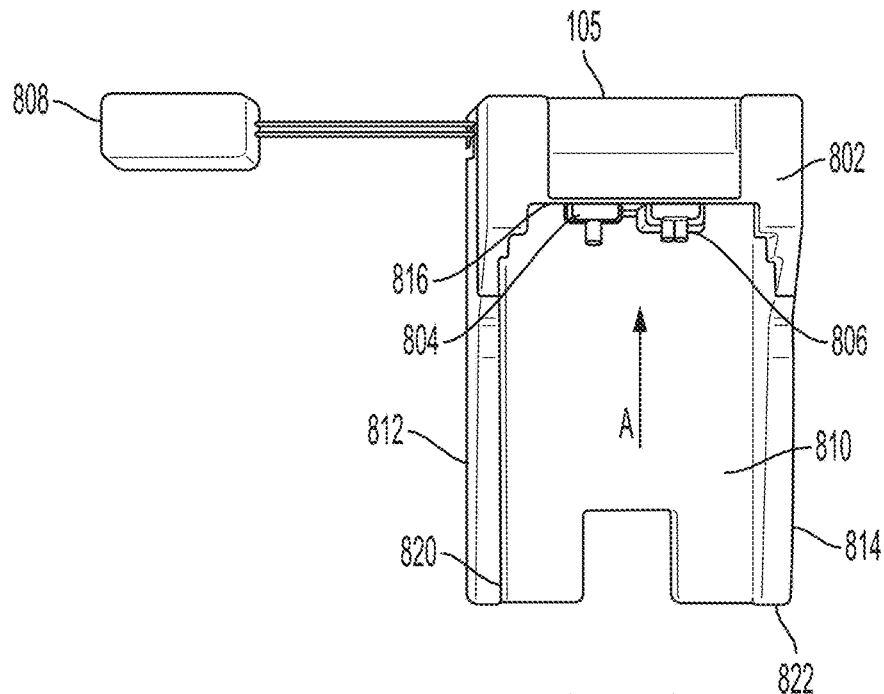
Figure 8C:
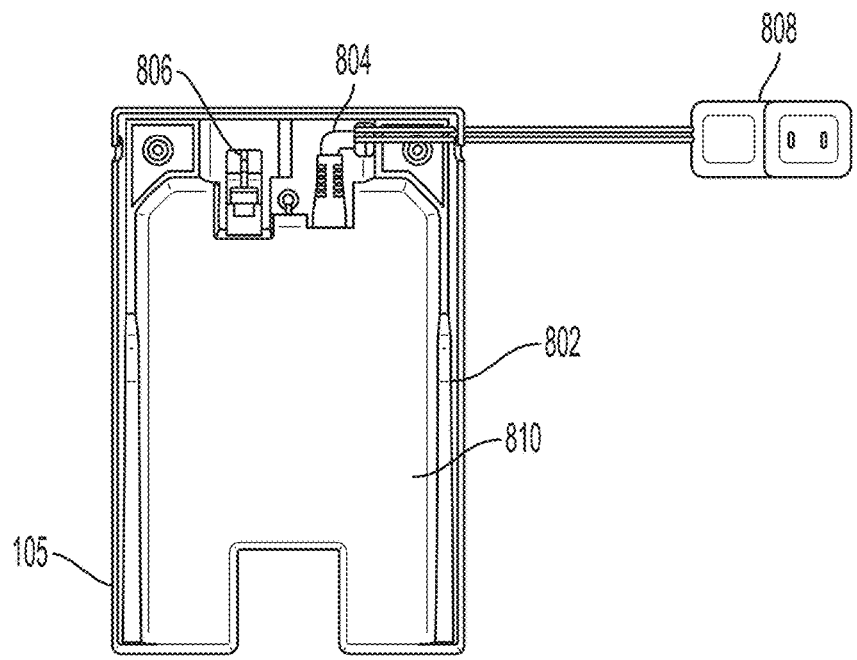

Turning now to FIGS. 8A-8C, an example transmitter base 105 includes a body 802, a power connector 804, and a perimeter wire connector 806. In some embodiments, the power connector 804 is electrically connected to an external power supply utilizing, for example, a power adapter 808 for connection to an external power source. The power connector 804, and perimeter wire connector 806 are sized and positioned to engage with the corresponding power connector 512 and perimeter wire connector 512 on the transmitter 104. When the transmitter 104 is installed in the transmitter base 105, an electrical connection is made between the transmitter 104 and the perimeter wire 106, and optionally, between the transmitter 104 and an external power source, via the transmitter base 105.

FIG. 8B is a top view of an example transmitter base 105. FIG. 8C is a bottom view of an example transmitter base 105. In an embodiment, the transmitter base 105 includes a generally rectangular body 802. In other embodiments, the transmitter base 105 can most any shape or size that corresponds to the general shape and size of the transmitter 104 that it is used with. The transmitter base body 802 can include a planar bottom portion 810, and one or more side walls 812, 814 extending away therefrom. The power connector 804 and perimeter wire connector 806 inwardly from a back wall 816 of the body 802 and are positioned to slidingly engage the corresponding power connector 510 and perimeter wire connector 512 of the transmitter 104.

The transmitter base body 802 can include retaining grooves 818, 820, 822 arranged along any of the bottom portion 810, sidewalls 812, 814 and/or back wall 816. The retaining grooves 818, 820, 822 help guide the insertion of the transmitter 104 into the transmitter base 105, thereby lining up the connectors 804, 806 for proper engagement with the connectors of the transmitter 510, 512.

The transmitter base 105 bottom portion 810, sidewalls 812, 814 and/or back wall 816 slidingly engage and abut the corresponding features of the transmitter 104, securing the transmitter in place. When the transmitter 104 is installed in the transmitter base 105, the connector end of the transmitter 104 is placed at the open end of the transmitter base 105 and moved toward the connector end of the transmitter base 105 in the direction of the Arrow A. The transmitter 104 is slid into the transmitter base 105 until the transmitter base perimeter wire connector 804 and the transmitter base external power connector 806 are fully seated with the transmitter perimeter wire connector 510 and the transmitter external power connector 512, respectively, providing a secure electrical connection.

The transmitter base 105 can be installed, secured, and/or mounted in a variety of ways as shown in FIGS. 9A-9D. In an example installation, the transmitter base 105 is located inside a structure or protected area, for example, inside a garage, shed or home. Referring to FIG. 9A, the transmitter base 105 can be placed horizontally on a workbench or table, and conveniently located for access to external power, for example, for charging the battery of the transmitter 104.

In embodiments, and as shown in FIGS. 9B and 9C, the transmitter base 105 can be installed outdoors and can be hung or otherwise attached, and mounted in a horizontal or vertical orientation to a portion of the exterior of a building, a post 902, tree, or other suitable surface. The transmitter base 104 can include features, for example, detents, brackets, mounting holes 904 and the like, that facilitate hanging or mounting to vertical and horizontal surfaces.

Referring to FIG. 9D, the transmitter base 105 can be mounted utilizing stakes 906 which secure the transmitter base 105, the transmitter 104, to the ground in a horizontal position, i.e. parallel to the ground. In an embodiment, the stakes 906 can be the same as or similar to perimeter wire stakes utilized to secure the perimeter wire 106 to the ground. In further embodiments, when the transmitter 104 includes a solar panel 514 for battery charging, the transmitter base 105 can be installed outdoors in a position and location selected for optimized exposure to solar irradiance.

Figure 10:
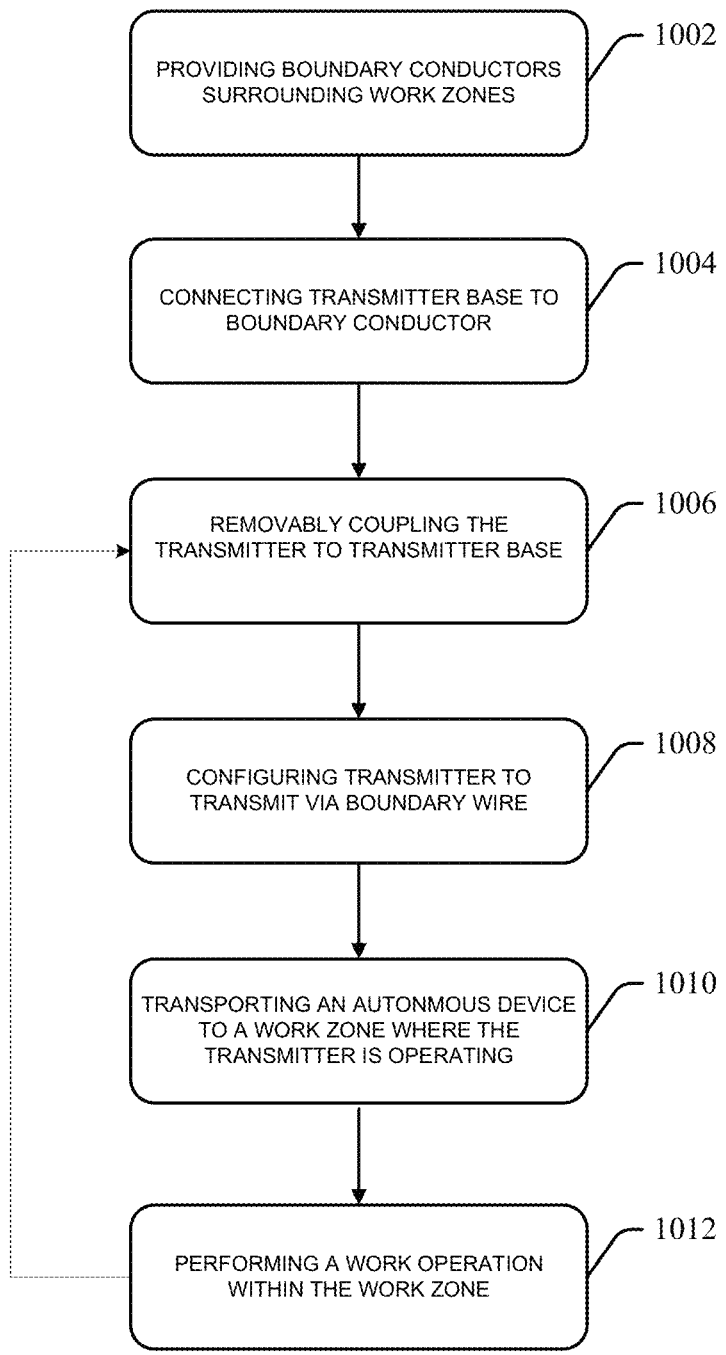
FIG. 10 is an example flow chart of operations for a method of autonomous mower zone mobility in accordance with aspects of the disclosure.

FIG. 10 illustrates a method 1000 for zone mobility for an autonomous device in accordance with aspects of the disclosure. While, for purposes of simplicity of explanation, the methodologies illustrated in FIG. 10 are shown and described as a series of acts, it is to be understood and appreciated that the subject disclosure is not limited by the order of acts, as some acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosure.

Still referring to FIG. 10, an example method 1000 for zone mobility for an autonomous device includes the acts of providing two or more electrically separated boundary conductors 1002, each boundary conductor surrounding a work zone within a work area within which the autonomous device is intended to operate, electrically connecting a transmitter base to at least one of the boundary conductors 1004, removably coupling the transmitter to the at least one transmitter base 1006, configuring a transmitter to transmit a signal for directing movement of the autonomous device on the boundary conductor wire 1008, and transporting an autonomous device to a work zone where the transmitter is operating 1010, and performing a work operation within the work zone 1010. The transmitter 104 can be removed from the transmitter base 105 and transported to another work zone where an additional transmitter base 105 has been installed, and the autonomous device transported to the additional work zone, where the transmitter is operating, to perform a work operation within the additional work zone.

In an embodiment, the act of providing two or more electrically separated boundary conductors 1002 includes providing at least one transmitter and/or at least one transmitter base electrically connected to each boundary conductor In further embodiments, each work zone is physically separate from other work zones. The act of transporting an autonomous device to a work zone where the transmitter is operating 1010 can include transporting the autonomous device to the work zone where the transmitter is removably coupled to the transmitter base.

In an embodiment, the disclosed systems and methods include features for reducing energy consumption, reducing operating costs associated with energy consumption, conserving battery power, maximizing the battery life of the transmitter 104, and/or for extending the time between charging the transmitter battery. A reduction in lost power also results in less heat generated by the transmitter 104. The system can include adaptive power optimization features, for example, the transmitter output power can be automatically adjusted to utilize power that is equal to, or slightly above, the level for transmitting a desired or optimal signal 112 on the perimeter wire 106.

An adaptable power optimization system for an autonomous device 102 can include a work area 108 within which the autonomous device 102 is intended to operate, one or more electrically separated boundary conductors 106, each boundary conductor 106 surrounding a work zone within the work area 108, and a transmitter 104 configured to transmit a signal 112 for directing movement of the autonomous device 102 on the boundary conductor wire 106, wherein the transmitter 104 is coupled to at least one boundary conductor 106, and the transmitted signal 112 is adjusted to optimize the power consumption of the transmitter 104.

Utilizing a calibration process, an optimal transmit signal can be determined taking into account, for example, wires 106 having different properties in terms of resistance and inductance. For example, work zones 202, 204 and 206 are different sizes and shapes, and changes made by the user to the length and/or shape of the wire 106, affect the properties of the electromagnetic signal produced by the wire 106. A shorter, smoother wire loop 106 is expected to require a less powerful transmitted signal 112 to effectively confine the autonomous device 102 within the work area or zone, while a wire 106 having a greater length and/or winding loops requires additional power to drive the signal 112.

Changes to the physical shape, size, and length of the wire loop 106 will tend to alter the resistance and impedance of the wire loop. That is, increasing the length of the wire loop 106 will tend to increase both its impedance and resistance, whereas decreasing the length of the wire loop 106 will tend to decrease both its impedance and resistance. Further, changes to the shape of the wire loop 106 may alter its impedance, even if its length remains the same.

Therefore, transmitting a signal 112 having the same properties, e.g., magnitude, phase, and frequency, etc., on wires 106 having different properties is not particularly efficient or effective. It is beneficial that the signal 112 be substantially the same, as seen by a receiver 102, regardless of how the wire 106 has been configured, for example, in terms of its length and shape.

Accordingly, a calibration process can be utilized that causes the transmitter 104 to operate in a power optimization mode. In an embodiment, the transmitter processing component 107 is configured to implement the calibration process to determine a waveform that, when applied to the wire loop 106, is expected to generate a signal 112 having properties that are the same as, or similar to, a predetermined optimal signal, or pre-established signal properties. When a signal 112 having properties the same as, or similar to, the predetermined signal is present within the wire loop 106, the wire loop 106 emits electromagnetic signals having the desired properties, for example, in terms of frequency, phase, and magnitude.

The predetermined signal can be derived based on, for example, the characteristics of the wire 106, the type of signal 112 that is transmitted, the characteristics of the coil sensors 114, 116, 118, 120 associated with the autonomous mower 102 which receive the transmitted signal 112, regulatory requirements, and/or other factors. Data associated with the predetermined signal can be stored on data storage forming part of the transmitter 104 or another part of the system 100, or can be provided to the system 100 as needed.

In an embodiment, the calibration process can include an analysis of series waveforms to determine a composition of a signal 112 that will result in the generation within the wire loop 108 of a signal 112 with the desired properties. In an embodiment, the signal 112 can include a linear combination of different frequency sinusoids, each having magnitude and phase properties. The magnitude and phase of the sinusoidal frequency components of the signal 112 can be derived through an analysis of the series of waveforms.

When the signal 112 is transmitted on the wire loop 106, the properties of the wire loop 106, which can be known, for example, via the calibration process, will affect the signal 112, thereby altering the magnitude and phase of the sinusoidal frequency components of the signal 112. In aspects, the calibration process is utilized to predict how the wire 106 will affect the transmitted signal 112, and then to determine how to adjust the transmitted signal 112 such that an optimal signal is ultimately generated in the wire 106, and transmitted to the receiver 102. Examples of suitable calibration processes and procedures are described in detail in International Patent Application No. PCT/IB2017/056038.

In other embodiments, the calibration process includes a control loop implemented to provide power optimization features. For example, voltage modulation can be used to control the peak current of the transmitted signal 112, and to regulate the current on the perimeter wire 106. Limiting the current by modulating the voltage allows for the efficient transmission of the signal 112 onto the wire 106.

In an embodiment, the peak current through the wire 106 is controlled by adjusting the applied voltage of the signal 112. Current through the wire 106 is a function of an applied voltage and the impedance of the wire 106. Control of the current is achieved by measuring or sampling the current through the wire 106, and adjusting the applied voltage to attain a desired peak current. The control loop can maintain the desired peak current through the wire 106, for example, by iteratively measuring the current through the wire and adjusting the applied voltage accordingly.

In embodiments, this approach can be utilized to control the current through multiple co-terminated boundary wires 106 by the transmitter 104 switching between different voltage levels. For example, two or more non-electrically separated boundary wires 106, can share one conductive lead between them. Each of the two or more non-electrically separated boundary wires 106 can have different electrical characteristics, and therefore, a different operating point for optimal power consumption. In that configuration, the transmitter 104 can time multiplex the signals 112 for each respective boundary wire 106, and the adaptable power optimization system automatically adjusts the voltage to the optimal level when transmitting in the time slice allotted to a given boundary conductor 106.

Voltage modulation of the transmitted signal 112 provides a cost effective and efficient mechanism for controlling the peak current of the transmitted signal 112. In contrast to conventional linear current regulation techniques which are inefficient from a power perspective, and traditional high-frequency switching techniques which are dependent on the impedance of the wire and require potentially noisy switching frequencies.

In an embodiment, the transmitter processing component 107 includes wire driver electronics including a wire driver amplifier, and a current sense amplifier for feeding back the drive current to a microcontroller. The microcontroller can control the signal 112 by use of an integrated digital to analog converter peripheral.

In an embodiment, the wire driver amplifier supply voltage can be minimized to aid in optimizing the efficiency of the transmitter 104. The output voltage for effectively driving the wire 112 can be determined, for example, utilizing data obtained, for example, via a calibration process as discussed in detail above. The fixed gain of the transmitter 104 wire driver amplifier can also be taken into account when determining an output voltage for effectively driving the signal 112 on the wire 106. In an embodiment, the output voltage is the minimum, or nearly minimum, voltage required to produce the desired signal 112 on the wire 106.

A transmitter 104 voltage regulator output (Vout) can be adjusted to the closest pre-determined value that is greater than or equal to a wire driver amplifier voltage supply for producing the output voltage. (See Table 1).

TABLE 1

Example voltage regulator output voltage settings.

| Wire Voltage | Power [mW] | $T_{J,max}$ [° C.] |
|---|---|---|
| 3.70 | 50 | 70 |
| 4.20 | 110 | 80 |
| 4.60 | 160 | 90 |
| 5.10 | 220 | 100 |

Figure 11:
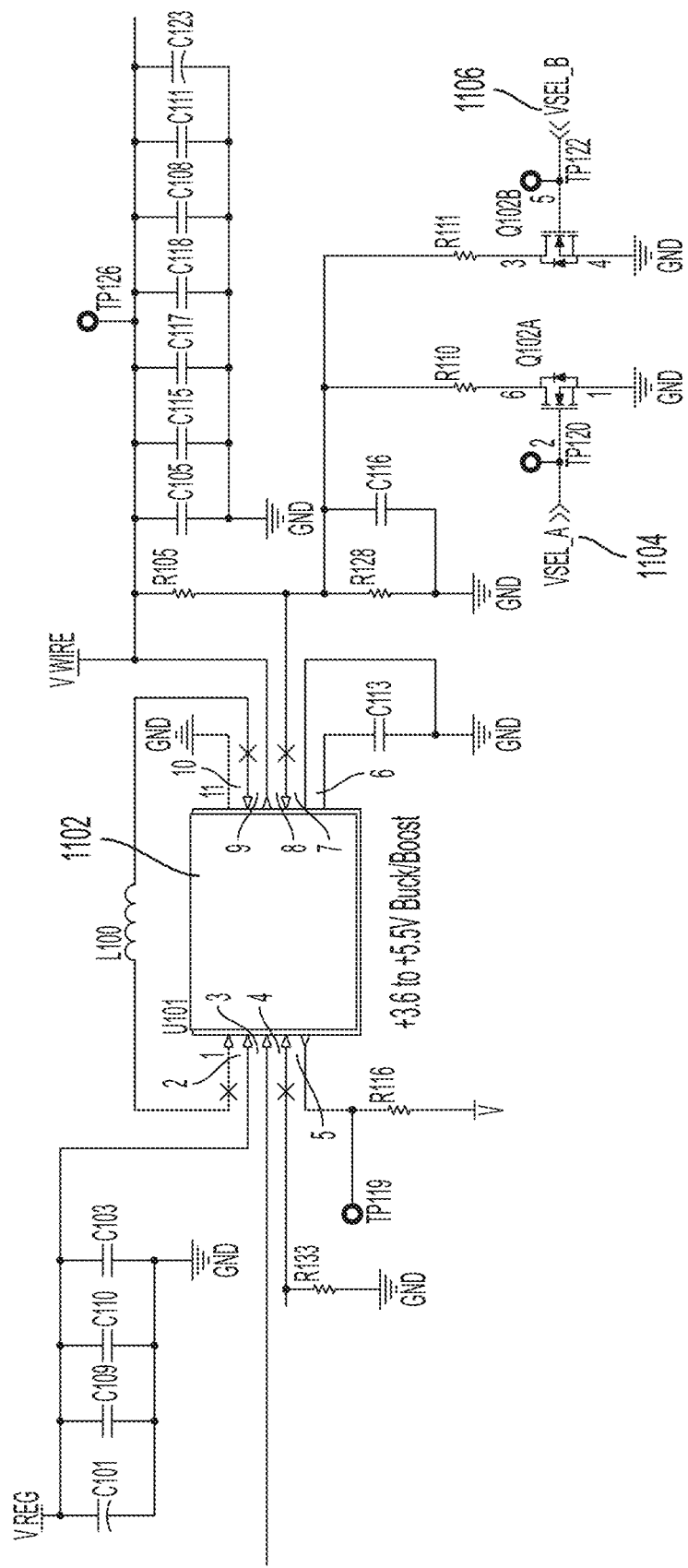
FIG. 11 is a schematic illustration of an example adaptive power optimization mechanism for autonomous mower zone mobility in accordance with aspects of the disclosure.

Turning to FIG. 11, in an embodiment, an adjustable voltage regulator 1102 for supplying power to the wire driver amplifier includes a buck regulator or converter (step down), a boost regulator or converter (step up), or a buck-boost converter or regulator whose output voltage magnitude is either greater than or less than an input voltage magnitude. In other embodiments, the adjustable voltage regulator includes discrete output ranges. In further embodiments, the adjustable voltage regulator includes a continuous output range.

The output of a buck-boost regulator 1102 can be controlled by switching in resistor combinations in parallel with an output voltage feedback divider VSEL_A 1104 and VSEL_B 1106, thereby providing a wire voltage select. In an embodiment, and as illustrated in Table 2 below, for particular values of the resistor combinations, e.g., $R_{105}$, $R_{128}$, $R_{110}$, $R_{111}$. For example, when VSEL_A 1104=0 and VSEL_B 1106=0, the output voltage is approximately 3.7 v. In an embodiment, when VSEL_A 1104=1 and VSEL_B 1106=0, the output voltage is approximately 4.2 v.

In further embodiments, when VSEL_A 1104=0 and VSEL_B 1106=1, the output voltage is 4.6 v. In an embodiment, when VSEL_A 1104=1 and VSEL_B 1106=1, the output voltage is approximately 5.1 v.

The supply voltage levels (Vout) demonstrated in Table 2 below are for illustrative purposes, and an optimal wire driver amplifier supply voltage level can vary based on, for example, the characteristics of the wire 106, the type of signal 112 that is transmitted, the characteristics of the coil sensors 114, 116, 118, 120 associated with the autonomous mower 102 which receive the transmitted signal 112, and other factors.

TABLE 2

Adjustable Regulator Voltage Settings

| VSEL_A | VSEL_B | V_WIRE |
|---|---|---|
| 0 | 0 | 3.70 |
| 1 | 0 | 4.20 |
| 0 | 1 | 4.60 |
| 1 | 1 | 5.10 |

The transmitter processing component 107 can be programmed to operate in a power optimization mode. The power optimization mode can implement a calibration process as detailed above, and can be used to adjust the transmitted signal 112 such that the electromagnetic signals 112 produced by the wire loop 106 and received at a point within a work area 108 have the desired properties.

In an embodiment, the disclosed systems and methods include power optimization and power management features effective to conserve battery power, extend battery life, extend battery usage time, and/or maximize the time between battery charging operations.

The adaptive power optimization features of the disclosed systems and methods can be combined with other features, for example, powering the transmitter 104 utilizing solar power, and recharging the battery utilizing solar power. Additional features such as minimizing the amount of time the signal 113 is transmitted also contribute to optimizing the energy usage of the system.

As detailed above, the autonomous mower 102 can communicate with the transmitter 104 and cause the transmitter 104 to begin transmitting a signal 112, and then to cause the transmitter 104 to stop transmitting the signal 112, and to power down, after a pre-determined time period has elapsed, or when a work operation has been completed. The predefined time period can be useful for conserving energy, and preserving the battery life of the autonomous mower 102 and the transmitter 104.

Similarly, energy can be conserved utilizing the autonomous mower 102 start button, which can be activated multiple times depending on the size of the work area to be mowed. A length of operation time associated with each button activation, and a minimum and maximum number of button activations, can be customized based on, for example, the capabilities or specifications of the autonomous mower 102, and the transmitter 104, the user's preferences, and/or the area to be serviced.

Figure 12:
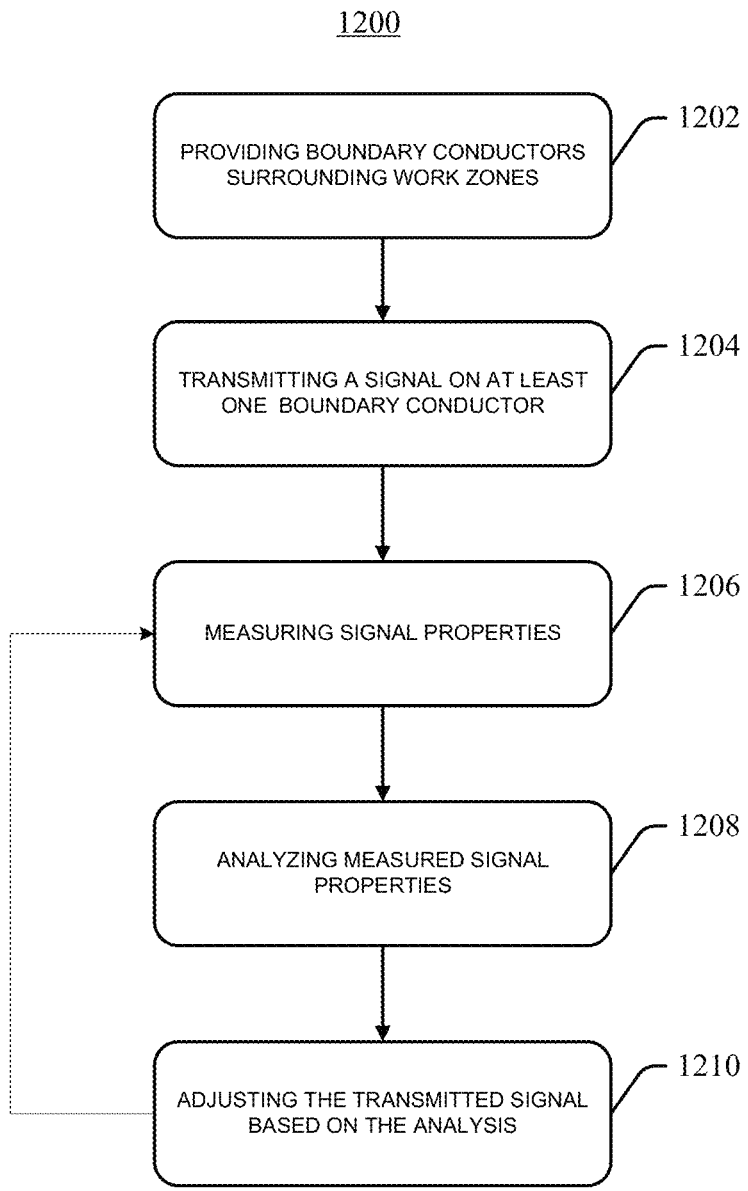
FIG. 12 is an example flow chart of operations for a method of adaptable power optimization in accordance with aspects of the disclosure.

Turning to FIG. 12, a method for adaptable power optimization is illustrated. While, for purposes of simplicity of explanation, the methodology illustrated in FIG. 12 is shown and described as a series of acts, it is to be understood and appreciated that the subject disclosure is not limited by the order of acts, as some acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosure.

A method for adaptable power optimization for an autonomous system 1200 can include the step 1202 of providing one or more electrically separated boundary conductors 106. The boundary conductor 112 surrounding a work zone within a work area 108. The transmitter 104 is electrically connected to at least one boundary wire 106, and is configured to transmit a signal 112 for directing movement of the autonomous device 102 on the boundary conductor wire 106.

At act 1204, the transmitter 104 transmits a signal 112 on at least one of the separated boundary conductors 106. At act 1206, 1208 and 1210, a calibration process is performed. For example, at act 1206, properties of the signal 112, e.g., the magnitude, and/or phase of the sinusoidal frequency components of the signal 112 are measured and/or sampled at the boundary conductor wire 106.

At act 1208, an analysis of the magnitude and/or phase of the series waveforms is performed, and the resulting data is compared to a predetermined signal, or to a set of pre-established signal properties. At act 1210, the transmitted signal 112 can be adjusted based on the analysis performed at act 1208. The transmitted signal 112 can be iteratively measured, analyzed, and adjusted, for example, on a continuous basis, or on a pre-determined time schedule. For example, the power optimization process 1200 can be executed at system 100 start up, and when changing between work zones, e.g., 202, 204 and 206. Acts 1206, 1208, and 1210 can be performed at regular intervals, for example, from about once every thirty seconds to once every five minutes, or once every thirty minutes.

An example adaptive power optimization process 1200 has been described in detail above and can include, for example, a calibration process for determining an optimal transmit signal 112.

An adaptable power optimization system for an autonomous device can include measuring and analyzing the signal properties comprises a calibration process. The signal can include a linear combination of frequency sinusoid components, each frequency sinusoid component including a magnitude property and a phase property, and the calibration process can include measuring and analyzing the magnitude and phase properties of the sinusoidal frequency components.

An adaptable power optimization system for an autonomous device can include a calibration process including a control loop process comprising voltage modulation of the signal to control a peak current of the signal.

The transmitter can include a solar component for powering the transmitter and/or for charging a battery of the transmitter.

A system for an autonomous device can include a transmitter interface configured to receive instructions for commencing a work operation, the transmitter interface can be configured to receive instructions for commencing a work operation comprises a wireless interface. A system for an autonomous device can include a transmitter that transmits a signal for directing movement of the autonomous device on the boundary conductor wire based on an instruction received from the autonomous device. The instruction from the autonomous device can comprise a wireless signal.

A system for an autonomous device can include an instruction from the autonomous device to the transmitter causing the transmitter to begin transmitting at the commencement of a work operation and to stop transmitting at a completion of the work operation.

A system for an autonomous device can include an autonomous device interface including a switch configured to receive input for commencing or directing a work operation and establishing a work operation time period.

A method for adaptable power optimization for an autonomous system can include providing one or more electrically separated boundary conductors, each boundary conductor surrounding a work zone within a work area, a transmitter configured to transmit a signal for directing movement of the autonomous device on the boundary conductor wire, wherein the transmitter is coupled to at least one boundary conductor. The transmitter can include a processing component configured for transmitting a signal on at least one of the separated boundary conductors, measuring the properties of the transmitted signal at the boundary conductor, analyzing the signal properties, and adjusting the transmitted signal based on the analysis of the signal properties.

A method for adaptable power optimization for an autonomous system can include iteratively measuring the properties of the transmitted signal at the boundary conductor, analyzing the signal properties, and adjusting the transmitted signal based on the analysis of the signal properties. Measuring and analyzing the signal properties can comprise a calibration process.

A method for adaptable power optimization for an autonomous system can include a signal comprising a linear combination of frequency sinusoid components, each frequency sinusoid component including a magnitude property and a phase property; and the calibration process comprises measuring and an analyzing the magnitude and phase properties of the sinusoidal frequency components and comparing the magnitude and phase properties to a predetermined signal. The calibration process can include a control loop process comprising voltage modulation of the signal to control a peak current of the signal.

A method for adaptable power optimization for an autonomous system can include a transmitter having a solar component for powering the transmitter and/or for charging a battery of the transmitter.

A method for adaptable power optimization for an autonomous system can include a transmitter interface configured to receive instructions for directing a work operation, a transmitter interface configured to receive instructions for directing a work operation comprises a wireless interface, and/or transmitting a signal for directing movement of the autonomous device on the boundary conductor wire based on an instruction received from the autonomous device. The instruction from the autonomous device can comprise a wireless signal.

A method for adaptable power optimization for an autonomous system can include an instruction from the autonomous device to the transmitter causing the transmitter to begin transmitting thereby commencing a work operation and to stop transmitting at a completion of the work operation.

A method for adaptable power optimization for an autonomous system can include receiving input for commencing or directing a work operation and establishing a work operation time period based on switch input at an autonomous device interface.

A system for directing operation of an autonomous device can include a work area within which the autonomous device is intended to operate, one or more electrically separated boundary conductors, each boundary conductor surrounding a work zone within the work area, and a transmitter configured to transmit a signal for directing movement of the autonomous device on the boundary conductor, wherein the transmitter includes a solar component for powering the transmitter and/or for charging a battery of the transmitter.

A system for directing operation of an autonomous device can include a solar component comprising a collection of photovoltaic cells installed on an enclosure portion of the transmitter, and associated circuitry for charging the transmitter battery. The transmitter base can be installed adjacent to the work area in a position and location selected for an optimized exposure to solar irradiance.

A zone mobility system for an autonomous device can include a work area within which the autonomous device is intended to operate, one or more electrically separated boundary conductors, each boundary conductor surrounding a work zone within the work area, and a transmitter configured to transmit a signal for directing movement of the autonomous device on the boundary conductor, wherein a work operation is commenced utilizing a transmitter interface.

A zone mobility system for an autonomous device can include a transmitter for transmitting a signal for directing movement of the autonomous device on the boundary conductor wire based on an instruction received from the autonomous device. The instruction from the autonomous device can include a wireless signal.

While embodiments of the disclosed systems and methods have been described, it should be understood that the disclosed systems and methods are not so limited, and modifications may be made without departing from the disclosed systems and methods. The scope of the systems and method are defined by the appended claims, and all devices, processes, and methods that come within the meaning of the claims, either literally or by equivalence, are intended to be embraced therein.

The invention claimed is:

1. A zone mobility system for an autonomous device, comprising:
   a work area within which the autonomous device is intended to operate;
   one or more electrically separated boundary conductors, each boundary conductor surrounding a work zone within the work area, wherein the work zone comprises a first zone and a second work zone;
   a transmitter configured to transmit a signal for directing movement of the autonomous device on the boundary conductor, wherein the transmitter generates and transmits a signal that travels along the wire inducing magnetic fields, and wherein the transmitter is removably coupled to the boundary conductor; and
   at least one transmitter base electrically connected to at least one of the boundary conductors, wherein the transmitter is removably coupled to at least one transmitter base; and wherein the transmitter is configured to transmit the signal for directing movement of the autonomous device in the first work zone and the second work zone.

2. The zone mobility system for an autonomous device of claim 1, comprising at least one transmitter and/or at least one transmitter base electrically connected to each boundary conductor.

3. The zone mobility system for an autonomous device of claim 1, wherein the autonomous device is transported to the work zone where the transmitter is removably coupled to the transmitter base.

4. The zone mobility system for an autonomous device of claim 1, wherein
the transmitter is transported from a first transmitter base associated with the first work zone to the second transmitter base associated with the second work zone, and the transmitter is removably connected to the second transmitter base; and
the autonomous device is transported to the work zone associated with the second transmitter base.

5. The zone mobility system for an autonomous device of claim 1, wherein at least one transmitter base is electrically connected to an external power source.

6. The zone mobility system for an autonomous device of claim 1, wherein each electrically separate boundary conductor is electrically connected to a separate transmitter base.

7. The zone mobility system for an autonomous device of claim 1, wherein the transmitter comprises an enclosure including retaining structures and a boundary wire connector; and
wherein the transmitter is configured to engage and connect to corresponding features of the transmitter base.

8. The zone mobility system for an autonomous device of claim 1, wherein a work operation is commenced utilizing a transmitter interface.

9. The zone mobility system for an autonomous device of claim 1, wherein a work operation is commenced utilizing an autonomous device interface, and a work operation time period is established utilizing a switch input.

10. The zone mobility system for an autonomous device of claim 1, wherein each work zone is physically separate from other work zones.

11. The zone mobility system for an autonomous device of claim 1, wherein at least one work zone is electrically connected to an autonomous device docking station.

12. The zone mobility system for an autonomous device of claim 1, wherein the boundary conductor comprises an electrically continuous conductor surrounding two or more work zones; and
the autonomous mower is transported to one or more of the work zones to perform a work operation.

13. A zone mobility method for an autonomous device, comprising:
providing two or more electrically separated boundary conductors, each boundary conductor surrounding a work zone within a work area within which the autonomous device is intended to operate;
configuring a transmitter to transmit a signal for directing movement of the autonomous device on the boundary conductor wire, wherein the transmitter generates and transmits a signal that travels along the wire inducing magnetic fields, and;
removably coupling the transmitter to at least one of the boundary conductors; and
electrically connecting at least one transmitter base to at least one of the boundary conductors; and removably coupling the transmitter to the at least one transmitter base.

14. The zone mobility method for an autonomous device of claim 13, comprising providing at least one transmitter and/or at least one transmitter base electrically connected to each boundary conductor.

15. The zone mobility method for an autonomous device of claim 13, wherein at least one transmitter base is electrically connected to an external power source.

16. The zone mobility method for an autonomous device of claim 13, wherein each electrically separate boundary conductor is electrically connected to a separate transmitter base.

17. The zone mobility method for an autonomous device of claim 13, comprising transporting the autonomous device to the work zone where the transmitter is removably coupled to the transmitter base.

18. The zone mobility method for an autonomous device of claim 13, wherein
the transmitter comprises an enclosure including retaining structures and a boundary wire connector; and
wherein the transmitter is configured to engage and connect to corresponding features of the transmitter base.

19. The zone mobility method for an autonomous device of claim 3, comprising
transporting the transmitter from a first transmitter base associated with a first work zone to a second transmitter base associated with a second work zone, wherein the transmitter is removably connected to the second transmitter base; and
transporting the autonomous device to the work zone associated with the second transmitter base.

20. The zone mobility method for an autonomous device of claim 13, comprising commencing a work operation utilizing a transmitter interface.

21. The zone mobility method for an autonomous device of claim 13, comprising commencing a work operation utilizing an autonomous device user interface, and establishing a work operation time period utilizing a switch input.

22. The zone mobility method for an autonomous device of claim 13, comprising transmitting the signal for directing movement of the autonomous device on the boundary conductor wire based on an instruction received from the autonomous device.

23. The zone mobility method for an autonomous device of claim 13, wherein each work zone is physically separate from other work zones.

24. The zone mobility method for an autonomous device of claim 13, wherein at least one work zone is electrically connected to an autonomous device docking station.

25. The zone mobility method for an autonomous device of claim 13, comprising transporting the autonomous mower to one or more of the work zones to perform a work operation, wherein the boundary conductor comprises an electrically continuous conductor surrounding two or more work zones.

\* \* \* \* \*